(12) United States Patent
Jöngren et al.

(10) Patent No.: US 9,769,807 B2
(45) Date of Patent: Sep. 19, 2017

(54) USER EQUIPMENT, RADIO NETWORK NODE AND METHODS THEREIN

(71) Applicant: TELEFONAKTIEBOLAGET L M ERICSSON (PUBL), Stockholm (SE)

(72) Inventors: George Jöngren, Sundbyberg (SE); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 51 days.

(21) Appl. No.: 13/907,529

(22) Filed: May 31, 2013

(65) Prior Publication Data

US 2014/0092827 A1 Apr. 3, 2014

Related U.S. Application Data

(60) Provisional application No. 61/707,811, filed on Sep. 28, 2012.

(51) Int. Cl.
 *H04W 72/04* (2009.01)
 *H04L 25/02* (2006.01)
 *H04L 5/00* (2006.01)

(52) U.S. Cl.
 CPC ......... *H04W 72/042* (2013.01); *H04L 5/0048* (2013.01); *H04L 5/0053* (2013.01); *H04L 5/0057* (2013.01); *H04L 5/0094* (2013.01); *H04L 25/0204* (2013.01); *H04L 25/0222* (2013.01); *H04L 25/0228* (2013.01); *H04L 5/001* (2013.01); *H04L 5/0035* (2013.01); *H04L 25/0202* (2013.01)

(58) Field of Classification Search
 CPC .............................. H04W 72/02; H04W 72/04
 See application file for complete search history.

(56) References Cited

U.S. PATENT DOCUMENTS

| | | | |
|---|---|---|---|
| 2011/0222485 A1* | 9/2011 | Nangia | H04B 7/0452 370/329 |
| 2013/0244676 A1* | 9/2013 | Koivisto | H04L 5/0048 455/452.1 |
| 2013/0279437 A1* | 10/2013 | Ng | H04W 48/16 370/329 |
| 2015/0312927 A1* | 10/2015 | Ko | H04B 7/024 370/336 |

OTHER PUBLICATIONS

Ko, The control information method for signalling [Method of Signaling Control Information for Coordinated Multi Point Transmission in Wireless Communication System] for the multipoint cooperation electrical transmission in the radio communications system., Sep. 27, 2017, English Translation of KR10-2012-0107619.*

(Continued)

*Primary Examiner* — Jeffrey M Rutkowski
*Assistant Examiner* — Thomas D Busch

(57) ABSTRACT

Embodiments herein relate to a method in a user equipment for performing channel estimation of one or more long term channel properties at the user equipment, wherein the user equipment is served by a radio network node.

42 Claims, 16 Drawing Sheets

(56) References Cited

OTHER PUBLICATIONS

Samsung: "Remaining issues on quasi co-location of antenna ports", 3GPP Draft; 3GPP TSG-RAN WG1#70 meeting, R1-123855, Mobile Competence Centre; 650, Route Des Lucioles; F-06921 Sophia-Antipolis Cedex; France, vol. RAN WG1, No. Qingdao; Aug. 13, 2012-Aug. 17, 2012, pp. 1, 2-5.

New Postcom: "Discussions on quasi-co-located antenna ports", 3GPP Draft; R1-123440, 3GPP TSG RAN WG1 Meeting #70, Mobile Competence Centre; 650, Route Des Lucioles; F-06921 Sophia-Antipolis Cedex; France, vol. RAN WG1, No. Qingdao, China; Aug. 13, 2012-Aug. 17, 2012, p. 2.

Ericsson et al: "LS response on antenna ports co-location", R1-124020, 3GPP TSG-RAN1 Meeting #70, Mobile Competence Centre; 650, Route Des Lucioles; F-06921 Sophia-Antipolis Cedex; France, vol. RAN WG1, No. Qingdao, China; Aug. 13, 2012-Aug. 17, 2012, pp. 1-2.

Renesas Mobile Europe LTD: "Signaling of CRS position information", 3GPP Draft; R1-123582, 3GPP TSG-RAN WG1 Meeting #70, Mobile Competence Centre; 650, Route Des Lucioles; F-06921 Sophia-Antipolis Cedex; France, vol. RAN WG1, No. Qingdao, China; Aug. 13, 2012-Aug. 17, 2012, p. 3, table 1.

* cited by examiner

USER EQUIPMENT, RADIO NETWORK NODE AND METHODS THEREIN

CROSS-REFERENCE TO RELATED APPLICATION

This application claims the benefit of U.S. Provisional Patent Application 61/707,811 filed Sep. 28, 2012.

TECHNICAL FIELD

Embodiments herein relate to a user equipment, a radio network node and methods therein. In particular embodiments herein relate to performing channel estimation of one or more long term channel properties at the user equipment.

BACKGROUND

In a typical radio communications network, wireless terminals, also known as mobile stations and/or user equipments (UEs), communicate via a Radio Access Network (RAN) to one or more core networks. The radio access network covers a geographical area which is divided into cell areas, with each cell area being served by a base station, e.g., a Radio Base Station (RBS), which in some networks may also be called, for example, a "NodeB" or "eNodeB". A cell is a geographical area where radio coverage is provided by the radio base station at a base station site or an antenna site in case the antenna and the radio base station are not co-located. Each cell is identified by an identity within the local radio area, which is broadcast in the cell. Another identity identifying the cell uniquely in the whole mobile network is also broadcasted in the cell. The base stations communicate over the radio interface operating on radio frequencies with the user equipments within range of the base stations.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks. A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g., eNodeBs in LTE, and the core network. As such, the RAN of an EPS has an essentially "flat" architecture comprising radio base station nodes without reporting to RNCs.

Improved support for heterogeneous network operations is part of the ongoing specification of 3GPP LTE Release-10, and further improvements are discussed in the context of new features for Release-11. In heterogeneous networks, a mixture of cells of differently sized and overlapping coverage areas are deployed. One example of such deployments is where pico cells are deployed within the coverage area of a macro cell. Other examples of low power nodes, also referred to as points, in heterogeneous networks are home base stations and relays. The aim of deploying low power nodes such as pico base stations within the macro coverage area is to improve system capacity by means of cell splitting gains as well as to provide users with wide area experience of very high speed data access throughout the network. Heterogeneous deployments are in particular effective to cover traffic hotspots, i.e. small geographical areas with high user densities served by e.g. pico cells, and they represent an alternative deployment to denser macro networks.

LTE is a Frequency Division Multiplexing technology wherein Orthogonal Frequency Division Multiplexing (OFDM) is used in a Downlink (DL) transmission from a radio base station to a user equipment. Single Carrier-Frequency Domain Multiple Access (SC-FDMA) is used in an uplink (UL) transmission from the user equipment to the radio base station. Services in LTE are supported in the packet switched domain. The SC-FDMA used in the UL is also referred to as Discrete Fourier Transform Spread (DFTS)-OFDM. Hence, LTE uses OFDM in the DL and DFTS-OFDM in the UL. The basic LTE downlink physical resource can thus be seen as a time-frequency grid as illustrated in FIG. 1, where each Resource Element (RE) corresponds to one subcarrier during one OFDM symbol interval on a particular antenna port. An antenna port is defined such that the channel over which a symbol on the antenna port is conveyed can be inferred from the channel over which another symbol on the same antenna port is conveyed. There is one resource grid per antenna port. A symbol interval comprises a cyclic prefix (cp), which cp is a prefixing of a symbol with a repetition of the end of the symbol to act as a guard band between symbols and/or facilitate frequency domain processing. Frequencies f or subcarriers having a subcarrier spacing $\Delta f$ are defined along an z-axis and symbols are defined along an x-axis.

In the time domain, LTE downlink transmissions are organized into radio frames of 10 ms, each radio frame comprising ten equally-sized subframes, denoted #0-#9, each with a Tsubframe=1 ms of length in time as shown in FIG. 2. A subframe is divided into two slots, each of 0.5 ms time duration. Furthermore, the resource allocation in LTE is typically described in terms of Resource Blocks (RB), where a resource block corresponds to one slot of 0.5 ms in the time domain and 12 contiguous 15 kHz subcarriers in the frequency domain. Two in time consecutive resource blocks represent a resource block pair and corresponds to the time interval upon which scheduling operates.

Resource blocks are numbered in the frequency domain, starting with resource block 0 from one end of the system bandwidth.

Transmissions in LTE are dynamically scheduled in each subframe where the base station transmits downlink assignments/uplink grants to certain UEs via the physical downlink control information such as Physical Downlink Control Channel (PDCCH) and enhanced PDCCH (ePDCCH). The PDCCHs are transmitted in the first OFDM symbol(s) in each subframe and spans, more or less, the whole system bandwidth. A UE that has decoded a downlink assignment, carried by a PDCCH, knows which resource elements in the subframe that contain data aimed for the UE. Similarly, upon receiving an uplink grant, the UE knows which time/frequency resources it should transmit upon. In LTE downlink, data is carried by the physical downlink shared data link on Physical Downlink Shared Channel (PDSCH) and in the uplink the corresponding link is referred to as the physical uplink shared link Physical Uplink Shared Channel (PUSCH).

Definition of enhanced downlink control signaling, i.e. ePDCCH, is ongoing in 3GPP. However, it is likely that such control signaling will have similar functionalities as PDCCH, with the fundamental difference of requiring UE specific Demodulation Reference Signals (DMRS) instead of Cell specific Reference Symbols (CRS) for its demodulation. One advantage is that UE specific spatial processing may be exploited for ePDCCH.

Demodulation of sent data requires estimation of the radio channel which is done by using transmitted reference symbols (RS), i.e. symbols known by the receiver. In LTE, CRS are transmitted in all downlink subframes and in addition to assist downlink channel estimation they are also used for mobility measurements performed by the UEs. LTE also supports UE specific RS aimed only for assisting channel estimation for demodulation purposes. The control information for a given user equipment is transmitted using one or PDCCH. This control signaling is typically transmitted in a control region comprising the first n=1, 2, 3 or 4 OFDM symbols in each subframe, where n is the Control Format Indicator (CFI). The downlink subframe also comprises CRS, which are known to the receiver and used for coherent demodulation of e.g. the control information. A downlink system with 3 OFDM symbols allocated for control signaling, for example the PDCCH, is illustrated in FIG. 3 and the 3 OFDM symbols are denoted as control region. The resource elements used for control signaling are indicated with wave-formed lines, resource elements used for data are indicated as white REs, and resource elements used for reference symbols are indicated with diagonal lines. Frequencies f or subcarriers are defined along an z-axis and symbols are defined along an x-axis. FIG. 3 illustrates how the mapping of physical control/data channels and signals can be done on resource elements within a downlink subframe. In this example, the PDCCHs occupy the first out of three possible OFDM symbols, so in this particular case the mapping of data could start already at the second OFDM symbol. Since the CRS is common to all UEs in the cell, the transmission of CRS cannot be easily adapted to suit the needs of a particular UE. This is in contrast to UE specific RS which means that each UE has RS of its own placed in the data region of FIG. 3 as part of PDSCH.

The length of the control region, which can vary on subframe basis, is conveyed in the Physical Control Format Indicator Channel (PCFICH). The PCFICH is transmitted within control region, at locations known by terminals. After a terminal has decoded the PCFICH, it thus knows the size of the control region and in which OFDM symbol the data transmission starts.

Also transmitted in the control region is the Physical Hybrid Automatic Repeat Request (Hybrid-ARQ or HARQ) Indicator, which carries Acknowledgement/Non-Acknowledgement (ACK/NACK) responses to the UE to inform if the uplink data transmission in a previous subframe was successfully decoded by the base station or not.

As previously indicated, CRS are not the only reference symbols available in LTE. As of LTE Release-10, a new RS concept was introduced with separate UE specific RS for demodulation of PDSCH and RS for measuring the channel for the purpose of Channel State Information (CSI) feedback from the UE. The latter is referred to as CSI-RS. CSI-RS are not transmitted in every subframe and they are generally sparser in time and frequency than RS used for demodulation. CSI-RS transmissions may occur every 5th, 10th, 20th, 40th, or 80th subframe according to a Radio Resource Control (RRC) configured periodicity parameter and an RRC configured subframe offset.

A UE operating in connected mode can be requested by the base station to perform CSI reporting, e.g. reporting a suitable Rank Indicator (RI), one or more Precoding Matrix Indices (PMI) and a Channel Quality Indicator (CQI). Other types of CSI are also conceivable including explicit channel feedback and interference covariance feedback. The CSI feedback assists the base station in scheduling, including deciding the subframe and RBs for the transmission, which transmission scheme/precoder to use, as well as provides information on a proper user bit rate for the transmission, link adaptation. In LTE, both periodic and aperiodic CSI reporting is supported. In the case of periodic CSI reporting, the UE reports the CSI measurements on a configured periodical time basis on the physical uplink control signaling (PUCCH), whereas with aperiodic reporting the CSI feedback is transmitted on the PUSCH at pre-specified time instants after receiving the CSI grant from the base station. With aperiodic CSI reports, the base station can thus request CSI reflecting downlink radio conditions in a particular subframe.

A detailed illustration of which resource elements within a resource block pair that may potentially be occupied by the new UE specific RS and CSI-RS is provided in FIG. 4. The CSI-RS utilizes an orthogonal cover code of length two to overlay two antenna ports on two consecutive REs. As seen, many different CSI-RS pattern are available. For the case of 2 CSI-RS antenna ports we see that there are 20 different patterns within a subframe. The corresponding number of patterns is 10 and 5 for 4 and 8 CSI-RS antenna ports, respectively. For Time Division Duplexing (TDD), some additional CSI-RS patterns are available.

Subsequently, the term CSI-RS resource may be mentioned. In such a case, a resource corresponds to a particular pattern present in a particular subframe. Thus two different patterns in the same subframe or the same CSI-RS pattern but in different subframes in both cases constitute two separate CSI-RS resources.

The CSI-RS patterns may also correspond to so-called zero-power CSI-RS, also referred to as muted REs. Zero-power CSI-RS corresponds to a CSI-RS pattern whose REs are silent, i.e., there is no transmitted signal on those REs. Such silent patterns are configured with a resolution corresponding to the 4 antenna port CSI-RS patterns. Hence, the smallest unit to silence corresponds to four REs.

The purpose of zero-power CSI-RS is to raise the Signal to Interference plus Noise Ratio (SINR) for CSI-RS in a cell by configuring zero-power CSI-RS in interfering cells so that the REs otherwise causing the interference are silent. Thus, a CSI-RS pattern in a certain cell is matched with a corresponding zero-power CSI-RS pattern in interfering cells. Raising the SINR level for CSI-RS measurements is particularly important in applications such as Coordinated Multi Point (CoMP) or in heterogeneous deployments. In CoMP, the UE is likely to need to measure the channel from non-serving cells and interference from the much stronger serving cell would in that case be devastating. Zero-power CSI-RS is also needed in heterogeneous deployments where zero-power CSI-RS in the macro-layer is configured so that it coincides with CSI-RS transmissions in the pico-layer. This avoids strong interference from macro nodes when UEs measure the channel to a pico node.

The PDSCH is mapped around the REs occupied by CSI-RS and zero-power CSI-RS so it is important that both the network and the UE are assuming the same CSI-RS/zero power CSI-RS configuration or else the UE is unable to decode the PDSCH in subframes containing CSI-RS or their zero-power counterparts.

Control Signaling in LTE Rel.8 to Rel.10

Messages transmitted over the radio link to users can be broadly classified as control messages or data messages. Control messages are used to facilitate the proper operation of the system as well as proper operation of each UE within the system. Control messages could include commands to control functions such as the transmitted power from a UE, signaling of RBs within which the data is to be received by the UE or transmitted from the UE and so on.

Examples of control messages are the PDCCHs which for example carry scheduling information and power control messages, the Physical HARQ Indicator Channel (PHICH), which carries ACK/NACK in response to a previous uplink transmission and the Physical Broadcast Channel (PBCH) which carries system information. Also the primary and secondary synchronization signals (PSS/SSS) can be seen as control signals with fixed locations and periodicity in time and frequency so that UEs that initially access the network can find them and synchronize.

The PBCH is not scheduled by a PDCCH transmission but has a fixed location relative to the PSS and SSSs. Therefore can the UE receive the system information transmitted in broadcast channel (BCH) before it is able to read the PDCCH.

In LTE Rel-10, all control messages to UEs are demodulated using the common or cell-specific reference signals (CRS) hence they have a cell wide coverage to reach all UEs in the cell without having knowledge about their position. An exception is the PSS and SSS which are stand-alone and does not need reception of CRS before demodulation. The first one to four OFDM symbols, depending on the configuration, in a subframe are reserved to contain such control information, see FIG. 3 and FIG. 5. Control messages could be categorized into those types of messages that need to be sent only to one UE, UE-specific control, and those that need to be sent to all UEs or some subset of UEs numbering more than one, common control, within the cell being covered by the eNB Control messages of PDCCH type are demodulated using CRS and transmitted in multiples of units called Control Channel Elements (CCE) where each CCE contains 36 REs. A PDCCH may have Aggregation Level (AL) of 1, 2, 4 or 8 CCEs to allow for link adaptation of the control message. Furthermore, each CCE is mapped to nine Resource Element Groups (REG) comprising four REs each. These REG are distributed over the whole system bandwidth to provide frequency diversity for a CCE. Hence, the PDCCH, which consists of up to 8 CCEs, spans the entire system bandwidth in the first one to four OFDM symbols, depending on the configuration. FIG. 5 discloses a mapping of 1 CCE belonging to a PDCCH to the control region which spans the whole system bandwidth.

Enhanced Control Signaling in Rel.11

FIG. 6 shows a Downlink subframe showing 10 RB pairs and configuration of three ePDCCH regions, marked black, of size 1 Physical Resource Block (PRB) pair each. The remaining RB pairs can be used for PDSCH transmissions.

In LTE Rel.11 it has been agreed to introduce UE-specific transmission for control information in form of enhanced control channels by allowing the transmission of generic control messages to a UE using such transmissions be based on UE-specific reference signals and by placement in the data region, see FIG. 6. This is commonly known as the enhanced PDCCH (ePDCCH), enhanced PHICH (ePHICH) and so on. For the enhanced control channel in Rel.11 it has been agreed to use antenna port p∈{107,108,109,110} for demodulation, see FIG. 7 for normal subframes and normal cyclic prefix. FIG. 7 shows an example of UE-specific reference symbols used for ePDCCH in LTE. R7 and R9 represent the DMRS corresponding to antenna port 107 and 109 respectively. In addition can antenna port 108 and 110 be obtained by applying an orthogonal cover as (1,−1) over adjacent pars of R7 and R9 respectively.

This enhancement means that precoding gains can be achieved also for the control channels. Another benefit is that different PRB pairs, or enhanced control regions, see FIG. 9 below, can be allocated to different cells or different transmission points within a cell, and thereby can inter-cell or inter-point interference coordination between control channels be achieved. This is especially useful for HetNet scenario as will be discussed in the next section.

Enhanced Control Signaling for HetNet and CoMP

The concept of a point is heavily used in conjunction with techniques for Coordinated Multipoint (CoMP). In this context, a point corresponds to a set of antennas covering essentially the same geographical area in a similar manner. Thus a point might correspond to one of the sectors at a site, but it may also correspond to a site having one or more antennas all intending to cover a similar geographical area. Often, different points represent different sites. Antennas correspond to different points when they are sufficiently geographically separated and/or having antenna diagrams pointing in sufficiently different directions. Techniques for CoMP entail introducing dependencies in the scheduling or transmission/reception among different points, in contrast to conventional cellular systems where a point from a scheduling point of view is operated more or less independently from the other points. DL CoMP operations may include, e.g., serving a certain UE from multiple points, either at different time instances or for a given subframe, on overlapping or not overlapping parts of the spectrum. Dynamic switching between transmission points serving a certain UE is often termed as Dynamic Point Selection (DPS). Simultaneously serving a UE from multiple points on overlapping resources is often termed as joint transmission (JT). The point selection may be based, e.g., on instantaneous conditions of the channels, interference or traffic. CoMP operations are intended to be performed, e.g., for data channels such as PDSCH and/or control channels such as ePDCCH.

The same enhanced control region, see FIG. 10, can be used in different transmission points within a cell or belong to different cells, that are not highly interfering each other. A typical case is the shared cell scenario, where a macro cell contains lower power pico nodes within its coverage area, having (or being associated to) the same synchronization signal/cell ID, see FIG. 8. In pico nodes which are geographically separated, as B and C in FIG. 8, the same enhanced control region, i.e. the same PRBs used for the ePDCCH can be re-used. In this manner the total control channel capacity in the shared cell will increase since a given PRB resource is re-used, potentially multiple times, in different parts of the cell. This ensures that area splitting gains are obtained. FIG. 8 shows a heterogeneous network scenario where the dashed line indicates the macro cell coverage area and A, B and C corresponds to the coverage of three pico nodes. In a shared cell scenario A, B, C and the macrocell have the same cell ID, e.g. the same synchronization signal, i.e. transmitted or being associated to the same synchronization signal.

An example is given in FIG. 9 where pico node B and C share the enhanced control region whereas A, due to the proximity to B, is of risk of interfering with each other and is therefore assigned an enhanced control region which is non-overlapping. Interference coordination between pico nodes A and B, or equivalently transmission point A and B, within a shared cell is thereby achieved. In some cases, a UE may need to receive part of the control channel signaling from the macro cell and the other part of the control signaling from the nearby Pico cell.

This area splitting and control channel frequency coordination is not possible with the PDCCH since the PDCCH spans the whole bandwidth. The PDCCH does not provide possibility to use UE specific precoding since it relies on the use of CRS for demodulation.

FIG. 10 shows an ePDCCH which, similar to the CCE in the PDCCH, is divided into multiple groups and mapped to one of the enhanced control regions. Note that in FIG. 10, the enhanced control region does not start at OFDM symbol zero, to accommodate simultaneous transmission of a PDCCH in the subframe. However, as was mentioned above, there may be carrier types in future LTE releases that do not have a PDCCH, in which case the enhanced control region could start from OFDM symbol zero within the subframe.

Distributed Transmission of Enhanced Control Signalling

Even if the enhanced control channel enables UE specific precoding and such localized transmission as illustrated in FIG. 10, it can in some cases be useful to be able to transmit an enhanced control channel in a broadcasted, wide area coverage fashion. This is useful if the eNB does not have reliable information to perform precoding towards a certain UE, then a wide area coverage transmission is more robust.

Another case is when the particular control message is intended to more than one UE, in this case UE specific precoding cannot be used. An example is the transmission of the common control information using PDCCH, i.e. in the common search space (CSS).

In any of these cases can a distributed transmission over enhanced control regions be used, see FIG. 11 for an example, where the 4 parts belonging to the same ePDCCH are distributed over the enhanced control regions. FIG. 11 shows a downlink subframe showing a CCE belonging to an ePDCCH is mapped to multiple of the enhanced control regions, to achieve distributed transmission and frequency diversity or subband precoding.

It has been agreed in the 3GPP ePDCCH development that both distributed and localized transmission of an ePDCCH should be supported corresponding to FIG. 11 and FIG. 10 respectively. When distributed transmission is used, then it is also beneficial if antenna diversity can be achieved to maximize the diversity order of an ePDCCH message. On the other hand, sometimes only wideband channel quality and wideband precoding information is available at the eNB for which it could be useful to perform a distributed transmission but with UE specific, wideband, precoding.

One fundamental property of DL CoMP is the possibility to transmit different signals and/or channels from different geographical locations or points. One of the principles guiding the design of the LTE system is transparency of the network to the UE. In other words, the UE is able to demodulate and decode its intended channels without specific knowledge of scheduling assignments for other UEs or network deployments.

For example, different Downlink Control Information (DCI) messages on ePDCCH may be transmitted from ports belonging to different transmission points. Even though there are several reasons for serving a UE with control signaling from different points, one application consists of distributing parts of the scheduling algorithm at different points, such that, e.g., DL transmissions are associated to a different point than UL transmissions. In such a case, it makes sense to schedule DL and UL transmissions with control signaling providing directly from the respective points. A further application consists of serving a UE with parallel data transmissions from different points, e.g., for increasing data rate or during handover between points. A further application consists of transmitting system control information from a "master" point and rely on data transmission from other points, typically associated to pico nodes.

In all the above applications it makes sense to have the possibility to serve the UE with control signaling on ePDCCH from different points in the same subframe. In any case, UEs are not aware of the geographical location from which each RS port is transmitted. DMRS or UE specific RS are employed for demodulation of data channels and possibly certain control channels, ePDCCH. UE specific RS relieves the UE from having to know many of the properties of the transmission and thus allows flexible transmission schemes to be used form the network side. This is referred to as transmission transparency, with respect to the UE. A problem is however that the estimation accuracy of UE specific RS may not be good enough in some situations.

Geographical separation of RS ports implies that instantaneous channel coefficients from each port towards the UE are in general different. Furthermore, even the statistical properties of the channels for different ports and RS types may be significantly different. Example of such statistical properties include the received power for each port, the delay spread, the Doppler spread, the received timing, i.e., the timing of the first significant channel tap, the number of significant channel taps, the frequency shift. In LTE, nothing can be assumed about the properties of the channel corresponding to an antenna port based on the properties of the channel of another antenna port. This is in fact key part of maintaining transmission transparency.

Based on the above observations, the UE needs to perform independent estimation for each RS port of interest for each RS. This results in occasionally inadequate channel estimation quality for certain RS ports, leading to undesirable link and performance degradation of the radio communications network.

SUMMARY

An object according to embodiments herein is to provide a mechanism that improves the channel estimation process in a radio communications network.

According to an aspect of embodiments herein, the object is achieved by a method in a user equipment for performing channel estimation of one or more long term channel properties at the user equipment. The user equipment is served by a radio network node. The user equipment assumes that a default Channel State Information Reference Signal, CSI-RS, resource is co-located with a Demodulation Reference signal, DMRS, port when co-location is not explicitly signalled from the radio network node. The default CSI-RS resource is configured by reading a predetermined entry in a configurable list of candidate co-location CSI-RS resources for a dynamic indication of co-location options in a DCI format. When assumed to be co-located, the user equipment estimates one or more long term channel properties of the DMRS port and the default CSI-RS resource based on the assumption that the default CSI-RS resource is co-located with the DMRS port.

According to another aspect of embodiments herein, the object is achieved by a method in a radio network node for transmitting reference signals. The user equipment is served by the radio network node. The radio network node determines that the user equipment assumes that a default CSI-RS resource is co-located with a DMRS port when co-location is not explicitly signalled to the user equipment. The default CSI-RS resource is configured by reading a predetermined entry in a configurable list of candidate co-location CSI-RS resources for a dynamic indication of co-location options in a DCI format. The radio network node also transmits a CSI-RS resource and a DMRS port in a co-located manner based on the determined assumption.

According to yet another aspect of embodiments herein, the object is achieved by user equipment for performing channel estimation of one or more long term channel properties at the user equipment. The user equipment is configured to be served by a radio network node. The user equipment comprises a processor configured to assume that a default CSI-RS resource is co-located with a DMRS port when co-location is not explicitly signalled from the radio network node. The default CSI-RS resource is configured by reading a predetermined entry in a configurable list of candidate co-location CSI-RS resources for a dynamic indication of co-location options in a Downlink Control Information, DCI, format; and, when assumed to be co-located, the processor is further configured to estimate one or more long term channel properties of the DMRS port and the default CSI-RS resource based on the assumption that the default CSI-RS resource is co-located with the DMRS port.

According to still another aspect of embodiments herein, the object is achieved by a radio network node for transmitting reference signals. The radio network node is configured to serve a user equipment. The radio network node comprises a processor configured to determine that the user equipment assumes that a default CSI-RS resource is co-located with a DMRS port when co-location is not explicitly signalled to the user equipment. The default CSI-RS resource is configured by reading a predetermined entry in a configurable list of candidate co-location CSI-RS resources for a dynamic indication of co-location options in a DCI format. The radio network node further comprises a transmitting circuit configured to transmit a CSI-RS resource and a DMRS port in a co-located manner based on the determined assumption.

By reading the default CSI-RS resource from a same configurable list of CSI-RS resources as is used for dynamic indication of co-location options in a DCI format, the user equipment obtains the information for improving the channel estimation in an efficient manner.

BRIEF DESCRIPTION OF THE DRAWINGS

Embodiments will now be described in more detail in relation to the enclosed drawings, in which.

DETAILED DESCRIPTION

Figure 1:
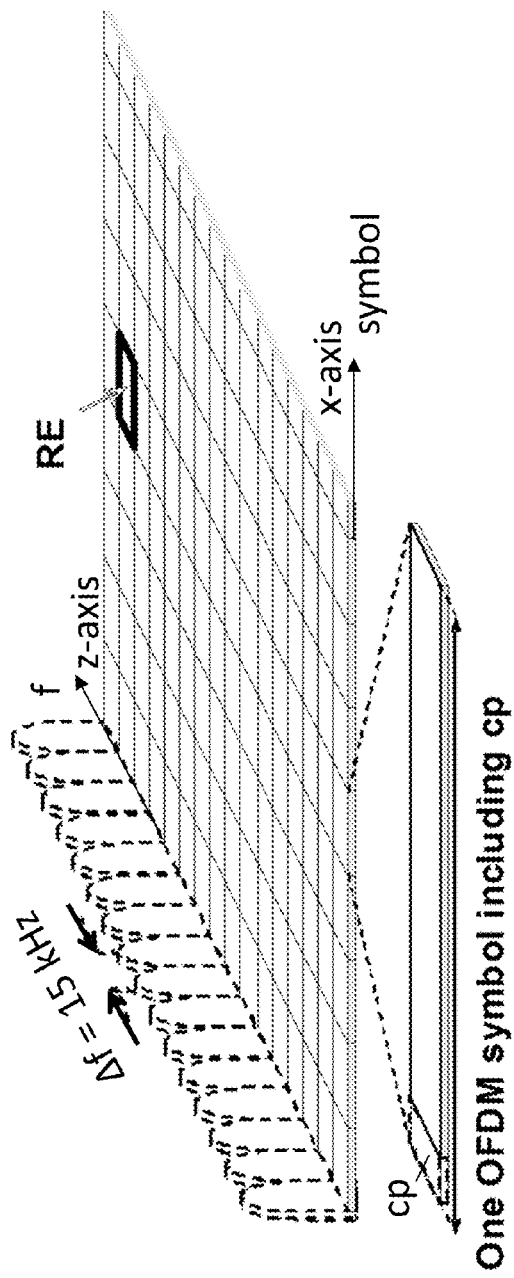
FIG. 1 shows resource elements in a symbol-frequency grid.
Figure 2:
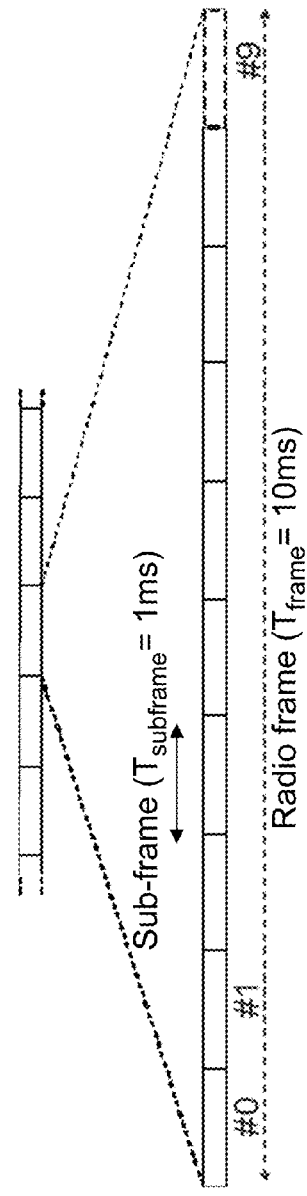
FIG. 2 shows a structure of a radio frame in a downlink transmission.
Figure 3:
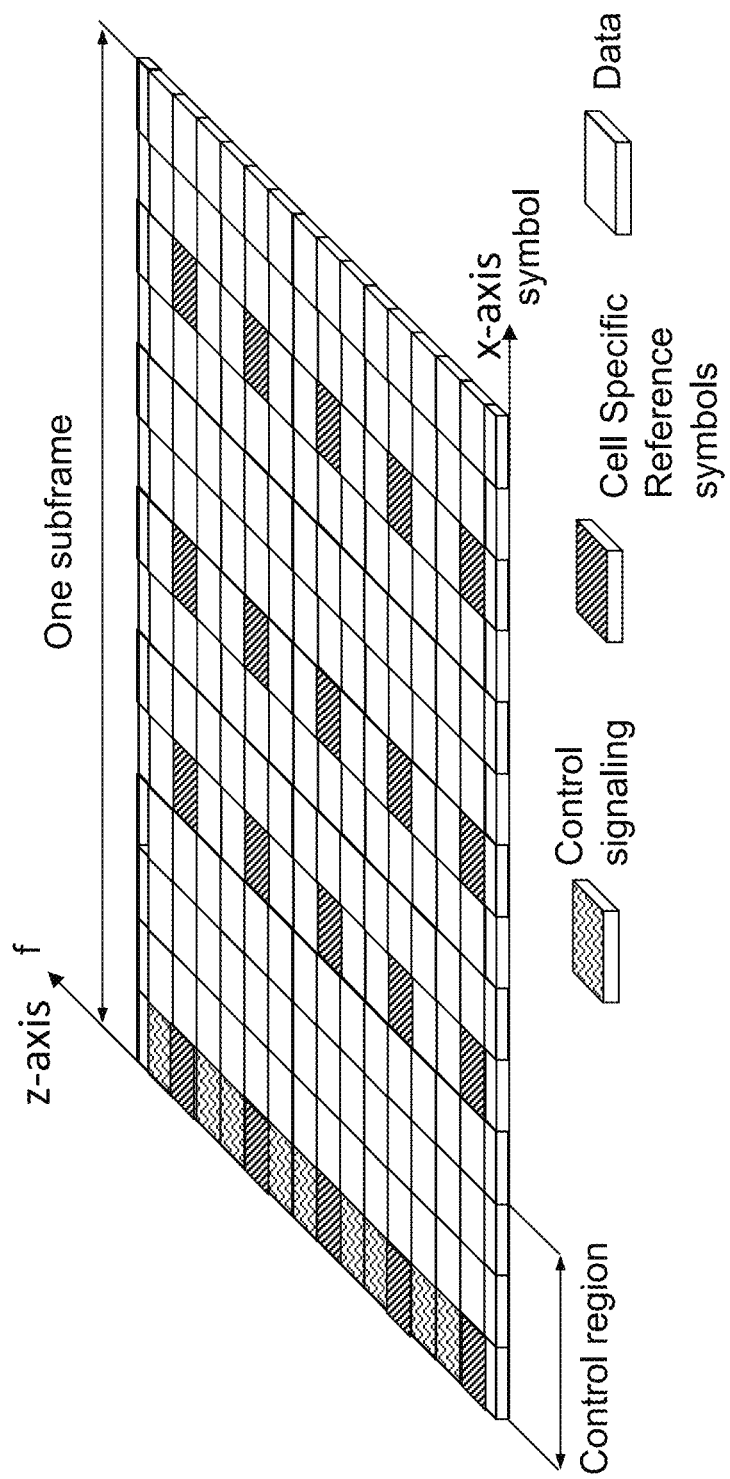
FIG. 3 shows resource elements in a symbol-frequency grid.
Figure 4:
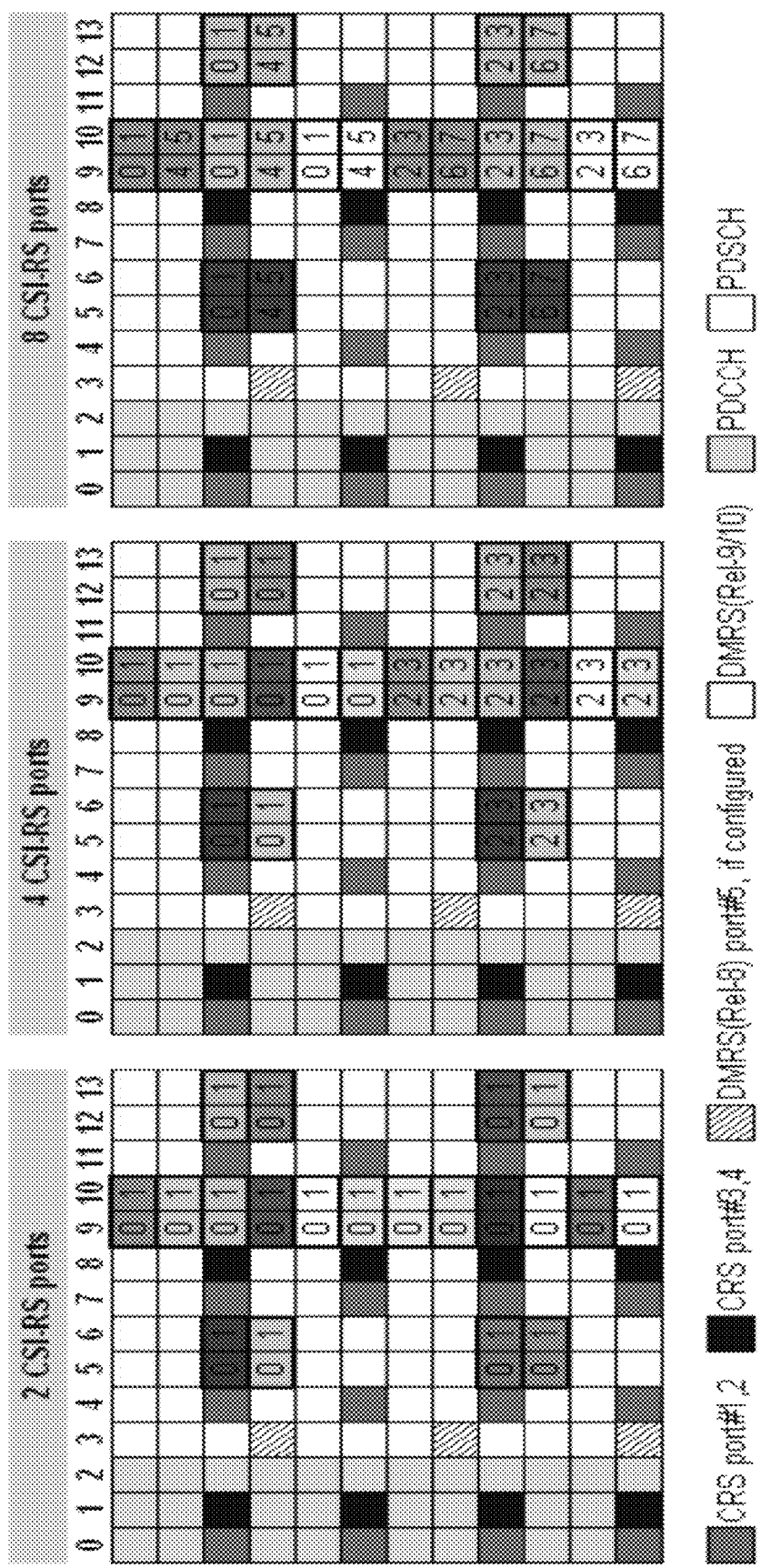
FIG. 4 shows resource elements occupied by different reference signals.
Figure 5:
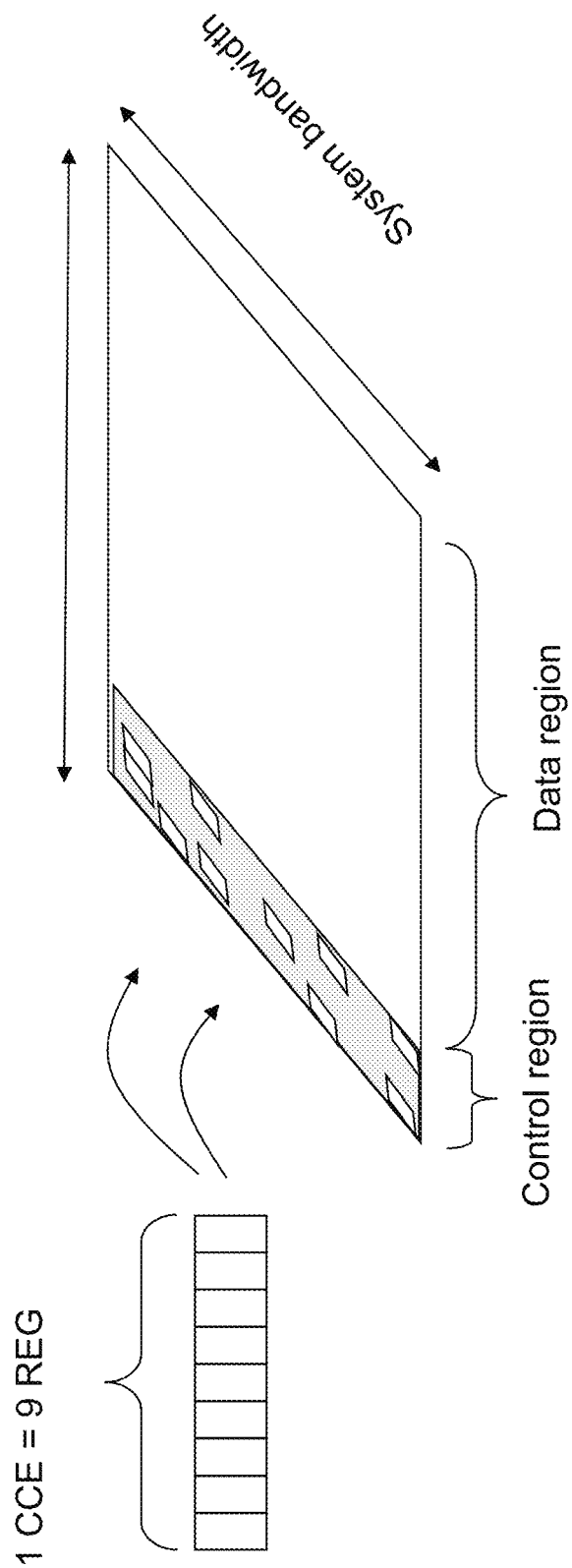
FIG. 5 shows a mapping of a Control Channel Elements to resource elements.
Figure 6:
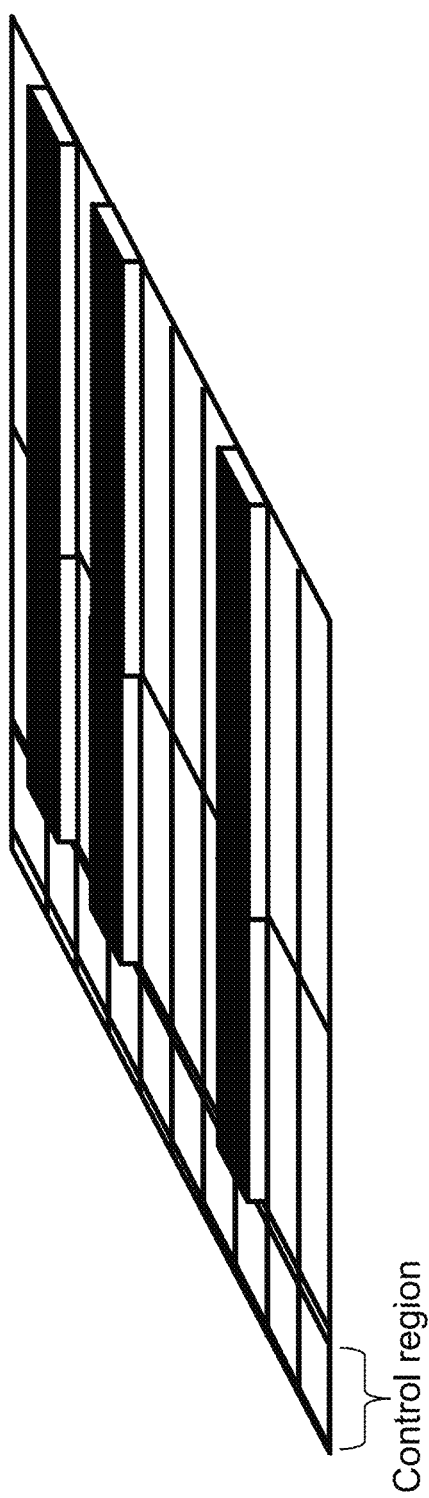
FIG. 6 shows the extra control regions of an ePDCCH.
Figure 7:
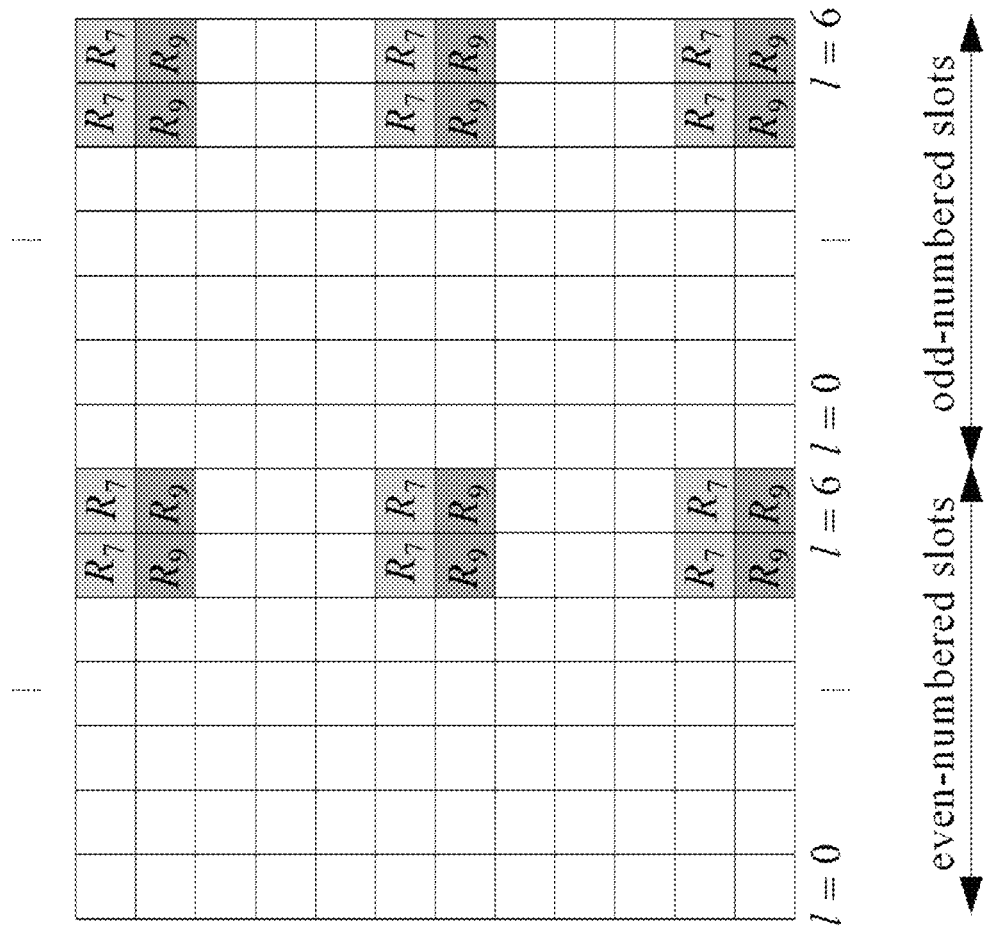
FIG. 7 shows reference symbols used for ePDCCH.
Figure 8:
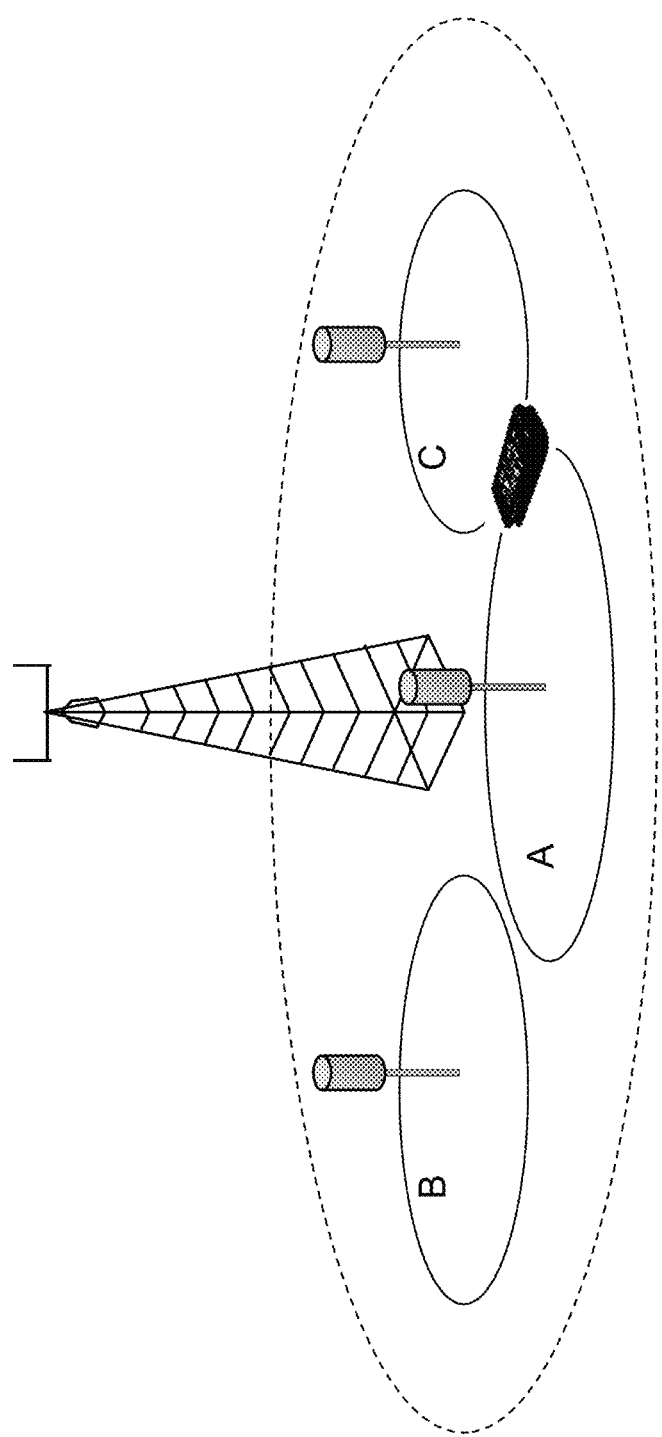
FIG. 8 shows a schematic overview depicting a network comprising different cells.
Figure 9:
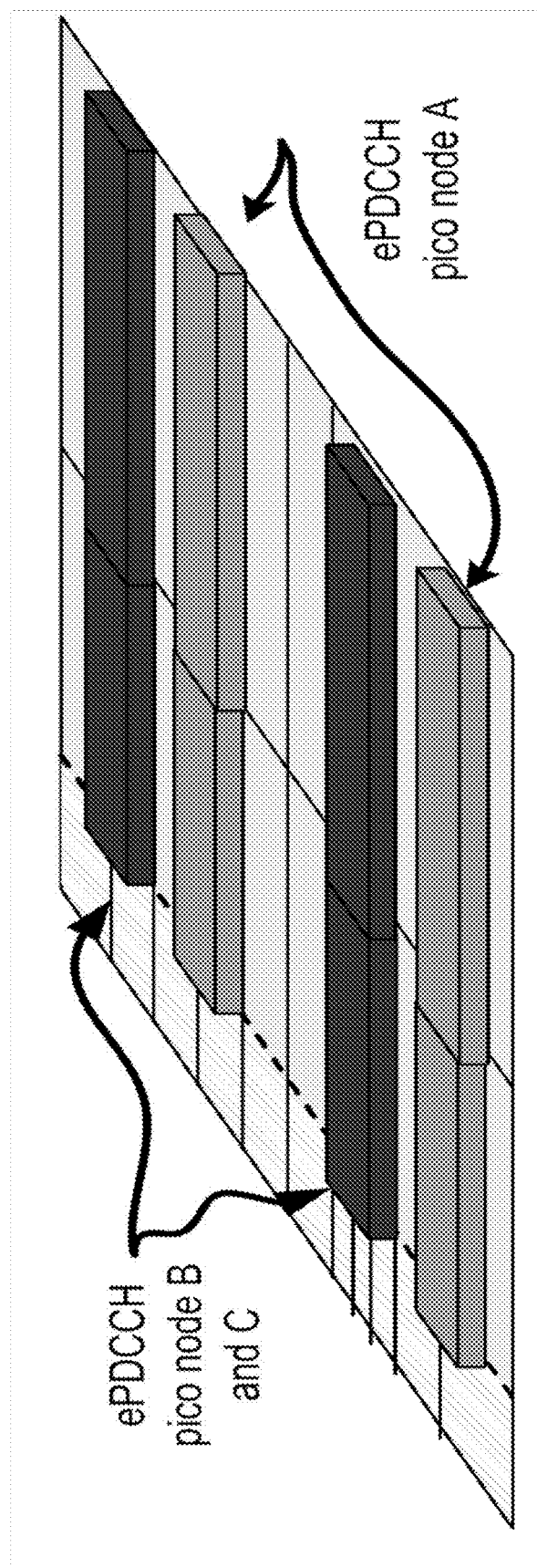
FIG. 9 shows how the different cells may share/divide the control region of ePDCCH.
Figure 10:
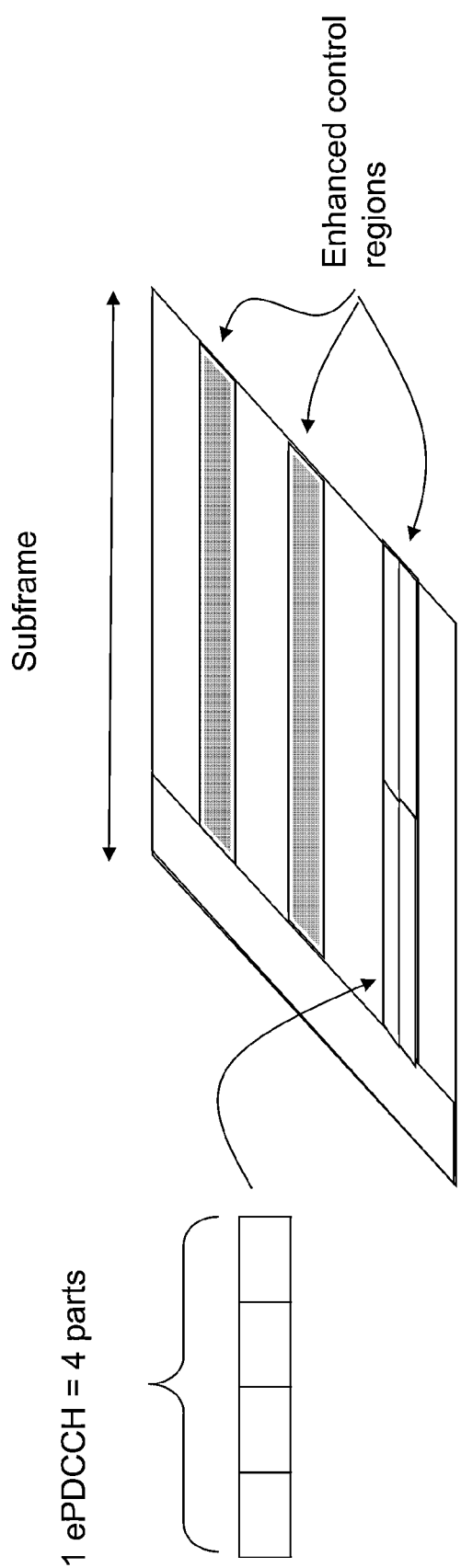
FIG. 10 shows an example how ePDCCH is mapped a control region.
Figure 11:
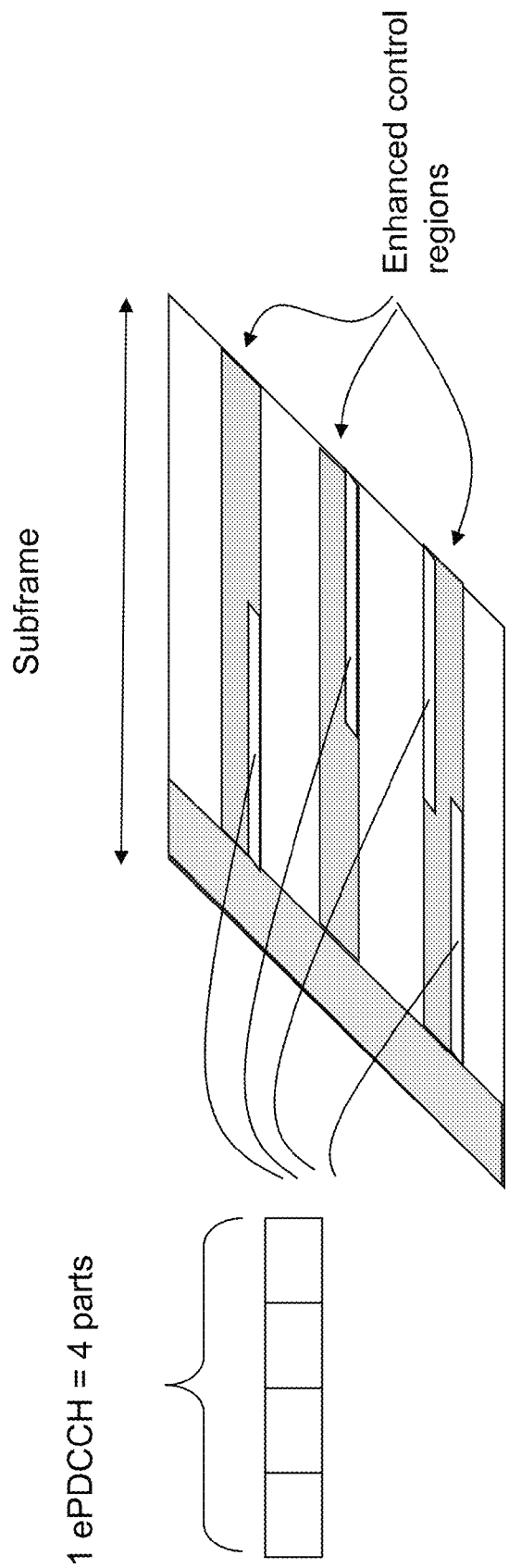
FIG. 11 shows another example hoe PDCCH is mapped to control regions.
Figure 12:
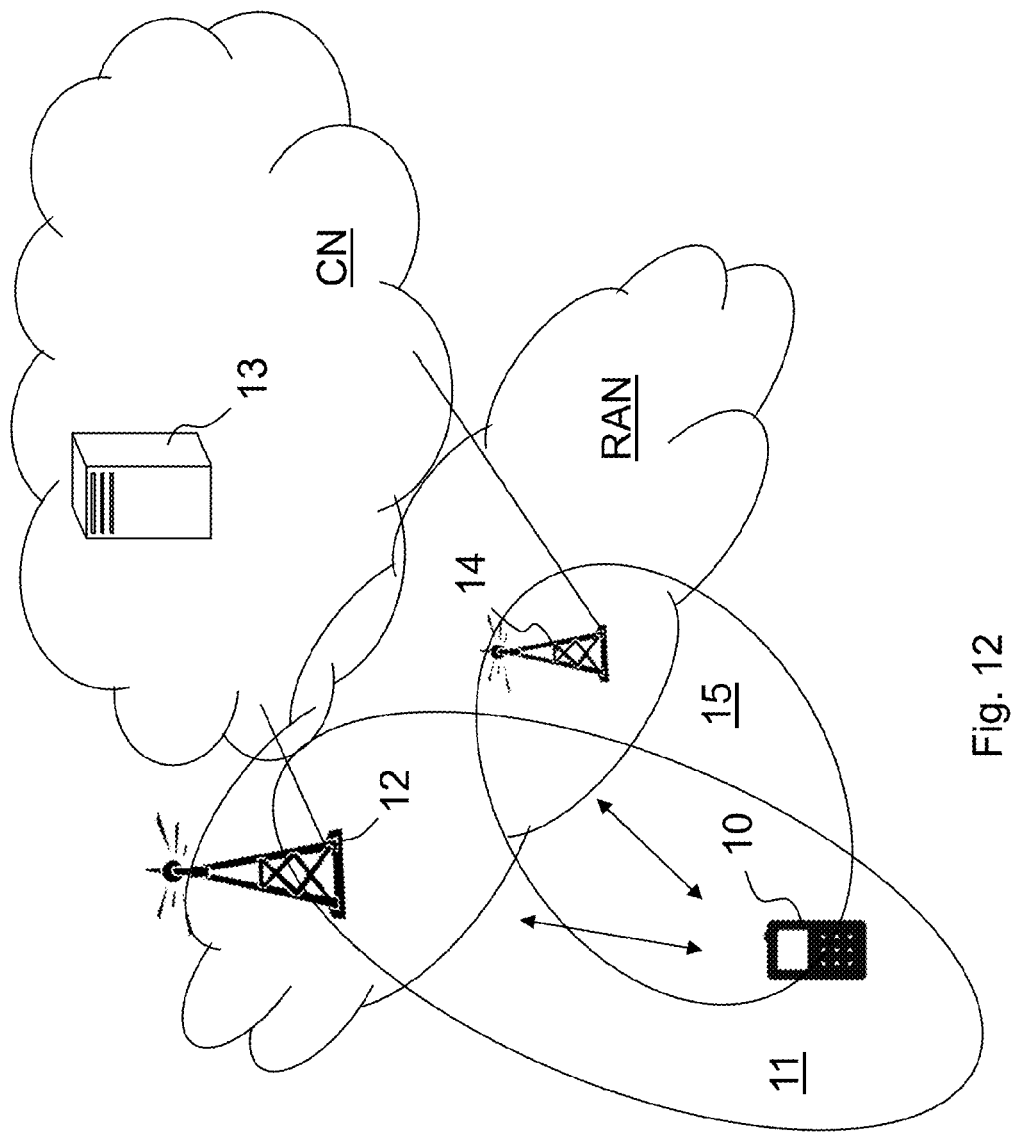
FIG. 12 shows a schematic overview depicting a radio communications network according to embodiments herein.

FIG. 12 is a schematic overview depicting a radio communications network 1. The radio communications network 1 comprises one or more Radio Access Networks (RAN) and one or more Core Networks (CN). The radio communications network 1 may use a number of different technologies, such as LTE, LTE-Advanced, WCDMA, Global System for Mobile communications/Enhanced Data rate for GSM Evolution (GSM/EDGE), Worldwide Interoperability for Microwave Access (WiMax), Code Division Multiple Access (CDMA) 2000 or Ultra Mobile Broadband (UMB), just to mention a few possible implementations. The radio communications network 1 is illustrated herein as an LTE network.

In the radio communications network 1, a user equipment 10, also known as a mobile station and/or a wireless terminal, communicates via a RAN to one or more CN. It should be understood by the skilled in the art that "user equipment" is a non-limiting term which means any wireless terminal, Machine-Type Communications (MTC) device or node e.g. Personal Digital Assistant (PDA), laptop, mobile, sensor, relay, mobile tablets or even a small base station communicating within respective cell.

The radio communications network covers a geographical area which is divided into cell areas, e.g. a first cell 11 being served by a radio base station 12. The radio base station 12 may also be referred to as a first radio base station. The radio base station 12 may be referred to as e.g. a NodeB, an evolved Node B (eNB, eNode B), a base transceiver station, Access Point Base Station, base station router, or any other network unit capable of communicating with a user equipment within the cell served by the radio base station depending e.g. on the radio access technology and terminology used. The radio base station 12 may serve one or more cells, such as the first cell 11.

A cell is a geographical area where radio coverage is provided by radio base station equipment at a base station site. The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the first cell 11 uniquely in the whole radio communications network 1 is also broadcasted in the first cell 11. The radio base station 12 communicates over the air or radio interface operating on radio frequencies with the user equipment 10 within range of the radio base station 12. The user equipment 10 transmits data over the radio interface to the radio base station 12 in UL transmissions and the radio base station 12 transmits data over an air or radio interface to the user equipment 10 in DL transmissions.

Furthermore, the radio communications network 1 comprises a core network node such as a Mobility Management Entity (MME) 13 for mobility management. Another, a different, or second, radio base station 14 is also comprised in the radio communications network 1. The second radio base station 14 provides radio coverage over a second cell 15, also referred to as another or a different cell, e.g. a cell neighboring or overlapping the first cell 11. The radio base stations 12 and 14 as well as the MME 13 are all examples of a radio network node.

It should be noted that the second cell 15 may also be served by the first radio base station 12, i.e. the first and second cells may be served by the same radio base station. Note also that, one radio base station may have Remote Radio Heads/Remote Radio Units which are placed away from the radio base station. So it may be one radio base station offering multiple cells from multiple nodes.

An interface between the respective radio base station 12, 14 and the MME 13 is an S1 interface, or more specifically S1-MME which is the control plane part of the S1 interface, and an interface between the first radio base station 12 and the second radio base station 14 is an X2 interface.

In some versions of the radio communications network 1 (not shown), several radio base stations are typically connected, e.g. by landlines or microwave, to a controller node, such as a Radio Network Controller (RNC) or a Base Station Controller (BSC), which supervises and coordinates various activities of the plural radio base stations connected thereto. The RNCs are typically connected to one or more CN. Also RNC or BSC are examples of a radio network node.

Embodiments herein relate to wireless communications receivers, and more particularly to antenna ports and Layer 1 control signaling. Note again that although terminology from 3GPP LTE is used in this disclosure to exemplify embodiments herein, this should not be seen as limiting the scope of the invention to only the aforementioned system. Other wireless systems, including WCDMA, WiMax, UMB and GSM, may also benefit from exploiting the ideas covered within this disclosure.

Throughout this disclosure, nodes or points in a network are often referred to as being of a certain type, e.g. "macro" or "pico". Unless explicitly stated otherwise, this should not be interpreted as an absolute quantification of the role of the node/point in the network but rather as a convenient way of discussion the roles of different nodes/points relative each other. Thus, a discussion about macro and picos could for example just as well be applicable to the interaction between micros and femtos.

Channel estimation based on Reference Signals (RS) often makes use of assumptions regarding similarity of the channels over which different RSs, where each RS typically corresponds to a logical entity called antenna port, are transmitted. Such assumptions of similar specific long term channel properties between different antenna ports are referred to as antenna port quasi co-location assumptions or a co-location assumption with respect to the considered long term channel property. The overall co-location assumptions a UE makes for a certain channel type, e.g. for PDSCH, or for ePDCCH, are collected into a co-location UE behavior, or "behavior" for short. With CoMP and the flexibility to transmit some signals from one point and even in the same Transmission Time Interval (TTI) transmit other signals from another point targeting the same user equipment 10, the UE channel estimator gets assistance from the network, the radio base station 12, in applying the appropriate behavior. The number of behaviors can easily become excessive without special precautions. It is an advantage if the number of different behaviors can be kept small from implementation complexity point of view as well as from signaling overhead perspective.

Embodiments herein provide different solutions which solve or at least alleviate these problems by intelligently limiting the number of behaviors in smart ways while keeping much of the flexibility in changing behavior. According to embodiments herein the user equipment 10 has a default CSI-RS resource that is taken from a same configurable list of CSI-RS resources as is used for dynamic indication of co-location options in a DCI format. E.g. the default CSI-RS resource is a same CSI-RS resource as one of the CSI-RS resources for dynamic indication of co-location options in the DCI format.

At least some aspects provide means and methods to reduce the signaling overhead in signaling co-location behaviors and reducing the implementation, testing and validation efforts for channel estimation corresponding to the different UE co-location behaviors.

Figure 13:
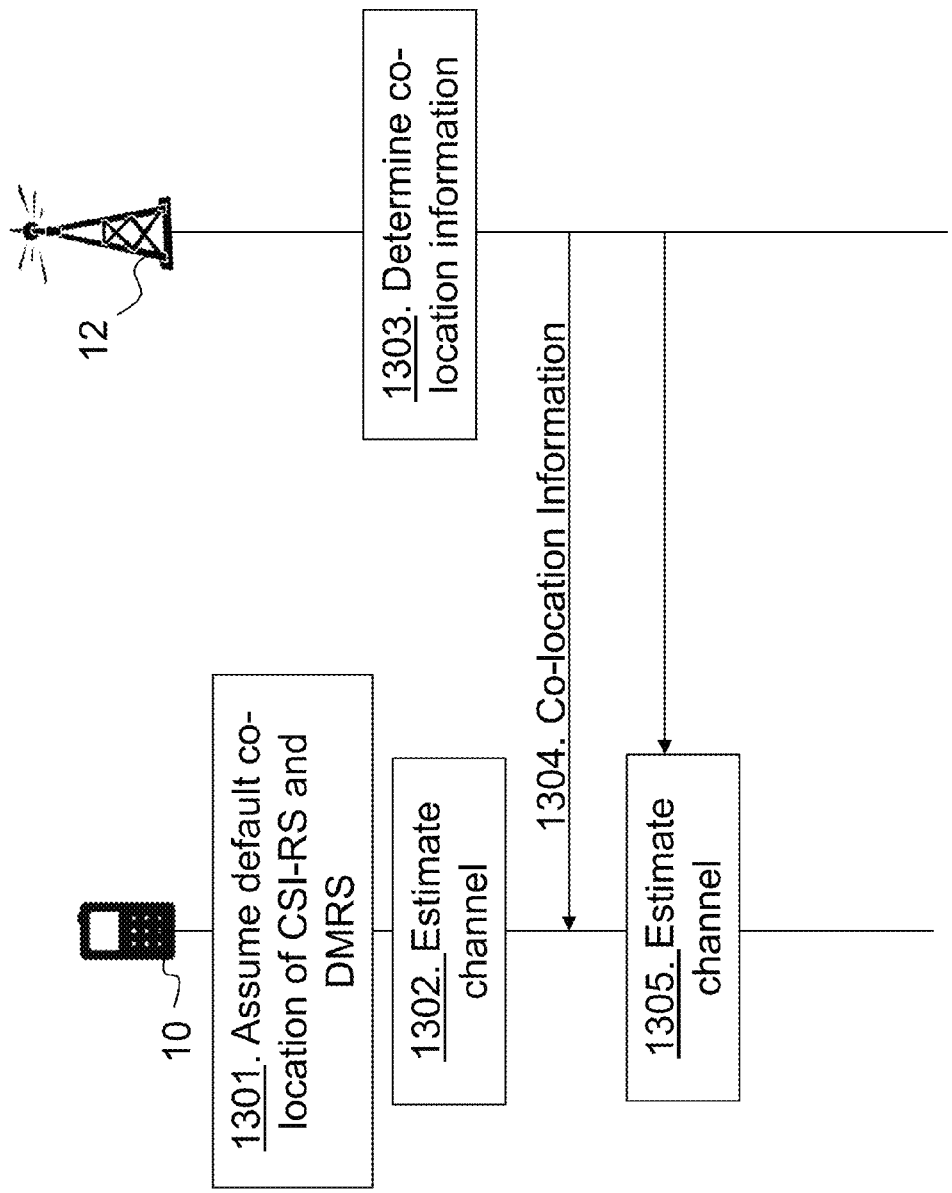
FIG. 13 shows a combined flow chart and signalling scheme according to embodiments herein.

FIG. 13 shows a schematic combined flowchart and signaling scheme according to embodiments herein. The radio network node is exemplified as the radio base station 12.

Action 1301. The user equipment 10 assumes that a default CSI-RS resource is co-located with a DMRS port when co-location is not explicitly signalled from the radio base station 12. The default CSI-RS resource is configured by reading a predetermined entry in a configurable list of candidate co-location CSI-RS resources for a dynamic indication of co-location options in a DCI format. The user equipment 10 may thus be configured with a parameter set for determining the co-location of CSI-RS resource and DMRS port. The parameter set is selected from a list of parameter sets configured by higher layer signaling.

Action 1302. The user equipment 10 estimates one or more long term channel properties of the DMRS port and the default CSI-RS resource based on the assumption that the default CSI-RS resource is co-located with the DMRS port. The user equipment 10 may thus use the configured parameter set, determining the PDSCH antenna port quasi co-location for decoding PDSCH corresponding to detected PDCCH/ePDCCH with DCI format 1A and PDSCH without a corresponding PDCCH associated with Semi-Persistent Scheduling (SPS) activation indicated in PDCCH/ePDCCH with DCI format 1A.

Action 1303. The radio base station 12 may dynamically determine a co-location information of resources and ports. That is, based on knowledge of ports and/or resources, the radio base station 12 determines for which ports and/or resources and/or long term channel properties the user equipment 10 is allowed to assume co-location of.

Action 1304. The radio base station 12 may then signal co-location information to the user equipment 10. The co-location information comprises, e.g. which reference signals may be assumed to be used in combination with each other to form a channel estimate corresponding to a certain antenna port. Similarly but in another language, the co-location information indicates e.g. which antenna ports may be assumed to have channels that can be utilized for inferring properties of the channel over which symbols for the antenna port of interest is conveyed. That is, the user equipment 10 may be signaled that it is allowed to assume that reference signals on some antenna ports may be used to assist in the channel estimation of a channel for another antenna port. A similar benefit is obtained by indicating to the user equipment 10 that a certain RS port transmitted on certain resources, e.g., PRB(s) may be assumed to share the same long term channel properties as the same, or possibly another, RS port transmitted over possibly different resources.

It is noted that co-location assumptions are sometimes equivalently defined as "quasi co-location" (QCL) assumptions, where the term "quasi" refers to the fact that co-location does not necessarily imply physical co-location of the antenna ports associated to the channels, but rather co-location with respect to the listed channel and signal properties, referred to as channel properties herein.

The antenna ports whose channels exhibit such mutual dependence may form a group. In practice, this assumption would allow the user equipment 10 to assume that at least some channel properties of the channels are similar over different antenna ports. Such information allows the user equipment 10 to jointly estimate channel properties and to achieve increased estimation accuracy for the corresponding channels estimates. Depending on the specific channel properties of the group and application, the grouping may be limited to a defined subset of the long term channel properties as seen by the user equipment 10. Such grouping of channel properties is sometimes equivalently referred to as "quasi co-location of antenna ports with respect to property X", where X indicates one or more long term RS property such as received power, average channel gain, delay spread, frequency shift, Doppler spread, propagation delay.

According to one embodiment, signaling of such groups may be based on network signaling, e.g. by RRC signaling via the radio base station 12, and configuration, or it may be based on defined rules that are described in a standard. Both the network and the user equipments need to comply with the standard. In other words, the network, radio base station 12, must comply with the co-location assumptions that are considered by the user equipment 10. If the user equipment 10 is allowed by the standard to assume that two RS ports may be assumed as co-located under certain conditions, e.g. as a default set up, the network, radio base station 12, transmits such RS ports in such a way that the relevant long term signal properties are experienced as co-located by the user equipment 10. Typically, but not always necessarily, this implies that such RS ports are transmitted from the same point. According to at least some embodiments, means and methods are provided for defining rules for DMRS ports co-location for RS associated to reception and demodulation for, e.g., ePDCCH, PDSCH, PDCCH and other channels. One possibility would be to assume that the user equipment 10 may assume that all DMRS ports for ePDCCH are co-located. However, such assumption would affect scheduling flexibility by not making it possible to transmit ePD-CCH from different points in the same subframe for a given UE. It should be noted that even though ePDCCH is given as an example in this particular embodiment, the disclosure is not limited to only the ePDCCH but to any other channel with similar characteristics.

Another solution would be to prevent the user equipment 10 from performing any ports co-location assumption. Such a solution would allow serving ePDCCH from different points for a given UE, but it would not allow the user equipment 10 to combine multiple RS that are quasi co-located in order to improve channel estimation quality and possibly reduce computational complexity for channel estimation. Demodulation of ePDCCH and PDSCH is supported by different sets of RSs, i.e., ePDCCH DMRS and PDSCH DMRS. Such RSs may in general be transmitted by different Transmission Points (TP), and they should not be assumed as co-located. At the same time, it would be wasteful to always assume that such RSs are never co-located, even with other RSs, as such very general assumption would prevent exploiting co-location for joint estimation of long term channel properties, when available.

One possibility is to allow multiple modalities, i.e., behaviours, for ePDCCH, where in some modalities ePDCCH DMRS may be assumed as co-located with some RS types, e.g., CSI-RS, while in other modalities ePDCCH DMRS may be assumed as co-located with other RS types, e.g., CRS. Similarly, the set of RS that ePDCCH RSs shall not be assumed as co-located with is specific for each "ePDCCH behaviour". The network is able to configure the preferred ePDCCH behaviour depending on the deployment. Co-location assumptions regarding co-location of the channels corresponding to different ePDCCH DMRS antenna ports may also be part of each ePDCCH behaviour.

The same principle is applied to PDSCH DMRS, where a number of "PDSCH behaviours" is defined. Typically, a PDSCH behaviour includes co-location assumptions with other RS types such as, e.g., CRS and CSI-RS. Quasi co-location assumption between CRS and CSI-RS may be also part of the PDSCH behaviour, as well as assumptions regarding co-location of the channels corresponding to different antenna ports within each RS type.

Co-location information can be dynamically signaled from the radio base station 12 using a Downlink Control Information (DCI) format transmitted on a DL control channel. For example, DCI format 2D used in transmission mode '10' may be used for signaling that DMRS for PDSCH is co-located with a specific CSI-RS resource. Basically a message state in the DCI format gives an index into a configurable table of CSI-RS resources used for defining the meaning of the message state.

It is observed herein that implementing all possible combinations of behaviours can be costly from a UE implementation point of view. Furthermore, each combination of UE behaviours may require individual testing, which is also associated to significant cost. There is also a signaling overhead associated to indication of the UE behaviours for PDSCH and ePDCCH.

It is further observed here that only a limited number of combinations of ePDCCH behaviours and PDSCH behaviours may be of practical interest for deployments. E.g., for deployments where CoMP functions are not exploited, it makes sense to let the user equipment 10 assume co-location of all available RS types. Similarly, for CoMP deployments where, e.g. PDSCH DMRS may be transmitted from different points than other RSs, there is no practical case in constraining co-location of ePDCCH DMRS with cell specific RS such as RS.

One aspect comprises grouping ePDCCH and PDSCH behaviours in a limited number of "Composite UE behaviours". By indicating a "Composite UE behaviour", both the ePDCCH behaviour and the PDSCH behaviour are implicitly defined. The mapping of ePDCCH behaviours and PDSCH behaviors may be defined in a standard or configured by the network, e.g. the radio base station 12, for each UE such as the user equipment 10. For each signaled "Composite UE behaviour", the user equipment 10 employs the co-location assumptions associated corresponding grouped PDSCH and ePDCCH behaviours. Thus, the configuration of a behavior for ePDCCH is not independent of the choice of behavior for PDSCH and that is exploited for saving signaling overhead. An example is reported in the following table:

TABLE 1

Example of composite behaviours mapping

| Composite behaviour | Supported ePDCCH Behaviour | Supported PDSCH Behaviour |
| --- | --- | --- |
| TM1-8 | ePDCCH Behaviour A | PDSCH Behaviour A |
| TM9 | ePDCCH Behaviour B | PDSCH Behaviour B |
| TM10 | ePDCCH Behaviour B | PDSCH Behaviour B |

In the example of table 1, the Composite UE Behaviours are indicated by the "Transmission modes" (TM) that are configured for the user equipment 10. In this example Behaviour A may represent a non-CoMP behaviour, different RSs are co-located, while behaviour B represents a CoMP behaviour, at least some RSs shall not be assumed as co-located.

According to some embodiments, the configuration of the ePDCCH behaviour and/or PDSCH behaviour is a function of the selected TM. Different TMs are typically associated with a different set of features such as channel quality reporting and transmission schemes. Some TMs, such as TM10, are well suited for CoMP operations, while other TMs, e.g., TM1-8, are less suited for CoMP. An intermediate example is TM9, which may in principle support CoMP with some limitation on multipoint feedback support. The advantage of this is that efficient configuration with reduced signaling is possible and too general UE implementations that are of limited practical interest may be avoided, with saving in terms of complexity, overhead and testing cost. The set of parameters that is configured for each behaviour is limited to those really relevant for the selected TM.

Another consideration is that it is typically more complicated to implement multiple UE behaviours as compared to implement different configuration mechanisms for a given behaviour. This embodiment allows a UE design based on very few UE behaviours, where flexibility and signaling efficiency is achieved by associating different configuration methods to the same UE behaviour, possibly as a function of the selected TM or other parameters. An example is provided in Table 2.

TABLE 2

Example of TM-dependent configuration of the same UE behaviour.

| Purpose: | Supported ePDCCH Behaviour |
| --- | --- |
| TM1-8 | ePDCCH Behaviour A |
| TM9 | ePDCCH Behaviour B (the reference CSI-RS resource for quasi co-location is the one used for CSI feedback) |

TABLE 2-continued

Example of TM-dependent configuration of the same UE behaviour.

| Purpose: | Supported ePDCCH Behaviour |
| --- | --- |
| TM10 | ePDCCH Behaviour B (the reference CSI-RS resource(s) for quasi co-location are configured by the network) |

As shown in the example in table 2, the ePDCCH behaviour B is configured differently depending if the user equipment 10 operates in TM9 or TM10. In TM9, the CSI-RS resource that may be assumed by the user equipment 10 to be co-located with ePDCCH DMRS is the CSI-RS configured in the user equipment 10 for CSI feedback. In TM10, the CSI-RS resource that may be assumed by the user equipment 10 to be co-located with ePDCCH DMRS is explicitly configured by the network.

In another example, assume that multiple CSI-RS resources may be needed for co-location with ePDCCH DMRS. E.g., individual CSI-RS resources may be assumed to be co-located by the user equipment 10 for each ePDCCH DMRS port, or for each ePDCCH set. Then, according to Table 2, in case TM9 is configured, the same CSI-RS resource may be assumed to be co-located with all ePDCCH ports and sets, without the need for the network to individually configure the CSI-RS reference resource for each port and set. On the opposite, for TM10, the network has the possibility to explicitly configure specific CSI-RS resources for co-location purposes for each ePDCCH DMRS port and/or set.

It should be noted that the same UE implementations, i.e., the same channel estimation algorithm, may be employed by the user equipment 10 for both TM9 and TM10.

In the illustrated example, the default RS, see action 1301, for co-location purposes is defined. For some applications and certain TMs, it is not possible for the network to indicate, e.g. the CSI-RS resource to be exploited for co-location with, e.g., PDSCH DMRS. The reason is that backwards compliant scheduling grants may need to be employed in certain applications, e.g. DCI format 1A in TM9-10 and DCI format 2C in TM9, and indication of co-location assumption was not included at the time such DCI formats were defined. The natural consequence would be that the user equipment 10 would not be able to assume any co-location between CSI-RS and PDSCH DMRS, resulting in the need to modify channel estimator implementations in the user equipment 10 to support such scenario. Due to cost of implementation flexibility this may be a less favorable solution. According to embodiments herein a definition of a default CSI-RS resource for co-location purposes is suggested. Note that such CSI-RS may be the same as one of the CSI-RS resources for dynamic indication of co-location options in DCI format, e.g. DCI format 2D in TM10, or 2C in TM9, or the CSI-RS for CSI feedback in TM9. In the former case, the configuration of the default CSI-RS resource may be achieved by reading a predetermined entry, e.g. the first, in an RRC configurable list of candidate co-location CSI-RS resources, RRC signaling being higher layer signalling. When the user equipment 10 is scheduled to use DMRS based PDSCH by a downlink assignment that does not provide co-location information, as explained above, the default CSI-RS resource for co-location is assumed to be co-located with PDSCH DMRS. This also provides extended support for dynamic switching of co-location CSI-RS resource as the co-location CSI-RS configured for DCI Format 1A may not be the same as any of the co-location CSI-RS resources configured for DCI format 2D, or 2C in case of TM9, to switch among.

A similar idea may be exploited for co-location of ePDCCH DMRS and CSI-RS. For certain UE behaviours and TMs, multiple CSI-RS resources are needed for configuration of ePDCCH DMRS co-location assumptions, e.g., a CSI-RS resource for each ePDCCH set and/or ePDCCH DMRS port. However, such complete configuration may require too large overhead and it might be incomplete, e.g., during set reconfigurations or initial configuration. In such cases, the user equipment 10 may assume co-location of ePDCCH DMRS ports with the default CSI-RS resource, at least for those sets/ports that lack explicit configuration. The default ePDCCH CSI-RS for co-location may in general differ from the default CSI-RS for PDSCH DMRS co-location.

It is also noted that the RS for co-location of DMRS does not necessarily need to be a CSI-RS resource, but it may be alternatively, e.g., a CRS or a synchronization signal.

Action 1305. The user equipment 10 performs channel estimation. Typically, channel estimation algorithms perform a three step operation. A first step consists of the estimation of some of the channel properties of the channel. A second step consists of generating an estimation filter based on such channel properties. A third step consists of applying the estimation filter to the received signal in order to obtain channel estimates. The filter may be equivalently applied in the time or frequency domain. Some channel estimator implementations may not be based on the three steps method described above, but still exploit the same principles.

Obviously, accurate estimation of filter parameters of the estimation filter in the first step leads to improved channel estimation. Even though it is often in principle possible for the user equipment 10 to obtain such filter parameters from observation of the channel over a single subframe and for one RS port, it is usually possible for the user equipment 10 to improve the filter parameters estimation accuracy by combining measurements associated with different antenna ports, i.e. different RS transmissions, sharing similar channel properties. Furthermore, the channel estimation accuracy may be improved by combining RSs associated with multiple PRBs. It is observed here that the network, i.e. the radio base station 12, is typically aware of which RS ports are associated with channels with similar channel properties, based on its knowledge how antenna ports are mapped to physical points, while the user equipment 10 is not aware a-priori of such information because of the network transparency principle.

At least some aspects of the disclosure comprises defining rules for DMRS ports quasi co-location for ePDCCH and PDSCH that allow the user equipment 10 to perform joint estimation of long term channel properties without ending up with a large number of different quasi co-location behaviors or high signaling overhead for configuring those.

At least according to some aspects in the present disclosure different solutions for smart configuration of co-location assumptions for various channels are presented.

At least some aspects of this disclosure provides means for efficient reconfiguration of UE behaviours for antenna ports quasi co-location purposes.

Of course, the present embodiments are not limited to the above-summarized features and advantages. Indeed, those skilled in the art will recognize additional features and advantages upon reading the following detailed description, and upon viewing the accompanying drawings.

Examples are described more fully hereinafter in which examples of embodiments are shown. The claimed solution may, however, be embodied in many different forms and should not be construed as limited to the embodiments set forth herein. It should also be noted that these embodiments are not mutually exclusive. Thus, components or features from one embodiment may be assumed to be present or used in another embodiment, where such inclusion is suitable.

The network, the radio base station 12, typically configures the user equipment 10 to assist reception of various signals and/or channels based on different types of reference signals including, e.g., CRS, DMRS, CSI-RS. Possibly, RS may be exploited for estimation of propagation parameters and preferred transmission properties to be reported by the UEs to the network, e.g., for link adaptation and scheduling.

It is observed here that, even though in general the channel from each antenna port to each user equipment receive port is substantially unique, some statistical properties and propagation parameters, referred to herein as channel properties, may be common or similar among different antenna ports, depending on whether the different antenna ports originate from the same point or not. Such channel properties include, e.g., the received power level for each port, the delay spread, the Doppler spread, the received timing, i.e., the timing of the first significant channel tap, and the frequency shift.

At least some embodiments in this disclosure comprise means and methods for enabling the user equipment 10 to obtain information about antenna ports quasi co-location in order to enable improved channel estimation in the user equipment 10. The user equipment 10 may then exploit such information to perform joint or partly joint channel estimation for at least some of the channels with similar channel properties.

Figure 14:
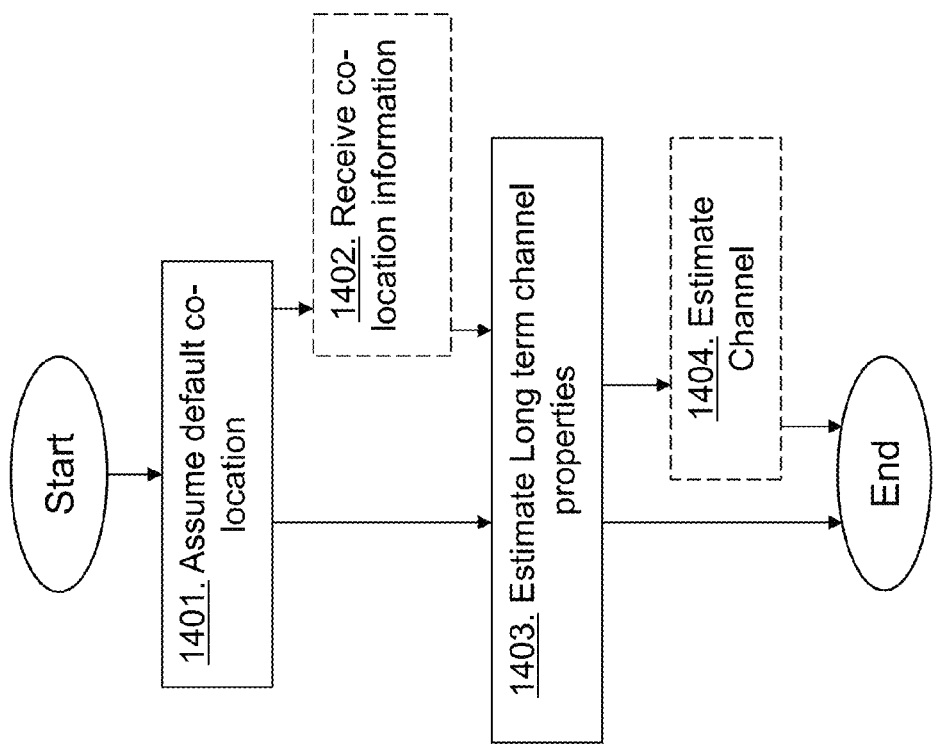
FIG. 14 shows a schematic flow chart depicting a method in a user equipment according to embodiments herein.

The method actions in the user equipment 10 in the figures, for performing channel estimation of one or more long term channel properties according to some embodiments will now be described with reference to a flowchart depicted in FIG. 14. The actions do not have to be taken in the order stated below, but may be taken in any suitable order. Actions performed in some embodiments are marked with dashed boxes. The user equipment 10 is served by a radio network node, such as the radio base station 12.

Action 1401. The user equipment 10 assumes that a default CSI-RS resource is co-located with a DMRS port when co-location is not explicitly signalled from the radio network node. The user equipment 10 thus uses a default setting. The default CSI-RS resource is configured by reading a predetermined entry in a configurable list of candidate co-location CSI-RS resources for a dynamic indication of co-location options in a DCI format. The DCI format may be the DCI format 2D. The DMRS port may be an ePDCCH DMRS port or a PDSCH DMRS port. The default CSI-RS resource may be a predetermined entry in a list of candidate co-location CSI-RS resources. The list may be a list for dynamic indication of co-location options. For example, if the user equipment 10 receives a grant from the radio base station 12 and the grant does not have any co-location information, the user equipment 10 may use a default setting. The default setting may be a pointer to a first entry in a list for DCI format 2D. The list in DCI format 2D is a list different states and the pointer points to a certain state giving a configuration for the default CSI-RS. The wording "not explicitly signaled" means e.g. that a received scheduling assignment for the user equipment 10, such as a DCI message, does not include a quasi-co-location field.

Action 1402. The user equipment 10 may in some embodiments receive a co-location information, overriding the default setting, from the radio network node 12, which co-location information comprises an indication of a behaviour, which behaviour is related to a co-location assumption. For example, may receive a message state in the DCI format 2D gives an index into a configurable table of CSI-RS resources used for defining the meaning of the message state. The user equipment 10 may receive co-location information using the DCI format 2D for signaling that DMRS port for PDSCH is co-located with a specific CSI-RS resource.

Action 1403. When assumed to be co-located, the user equipment 10 estimates one or more long term channel properties of the DMRS port and the default CSI-RS resource based on the assumption that the default CSI-RS resource is co-located with the DMRS port. The user equipment 10 may estimate channel by performing joint or partly joint channel estimation on signals from the DMRS port and the CSI-RS resource. The long term channel properties may comprise a group with respect of one or more long term reference signal properties comprising: received power, average channel gain, delay spread, frequency shift, Doppler spread, and propagation delay. The indication may be a composite behaviour indicating ePDCCH behaviour and a PDSCH behaviour. A configuration of the ePDCCH behaviour and/or the PDSCH behaviour may be a function of a selected transmission mode, wherein a set of parameters configured for each behaviour is limited to parameters relevant for the selected transmission mode. If the user equipment 10 is scheduled by a DCI format including dynamical co-location information, it relies on such information. Otherwise, e.g., with DCI format 1A in TM10, it relies on the default co-location resource as explained.

Action 1404. The long term channel properties may then be used to determine filter parameters based on such channel properties and then to apply the estimation filter to the received signal in order to obtain channel estimates.

Figure 15:
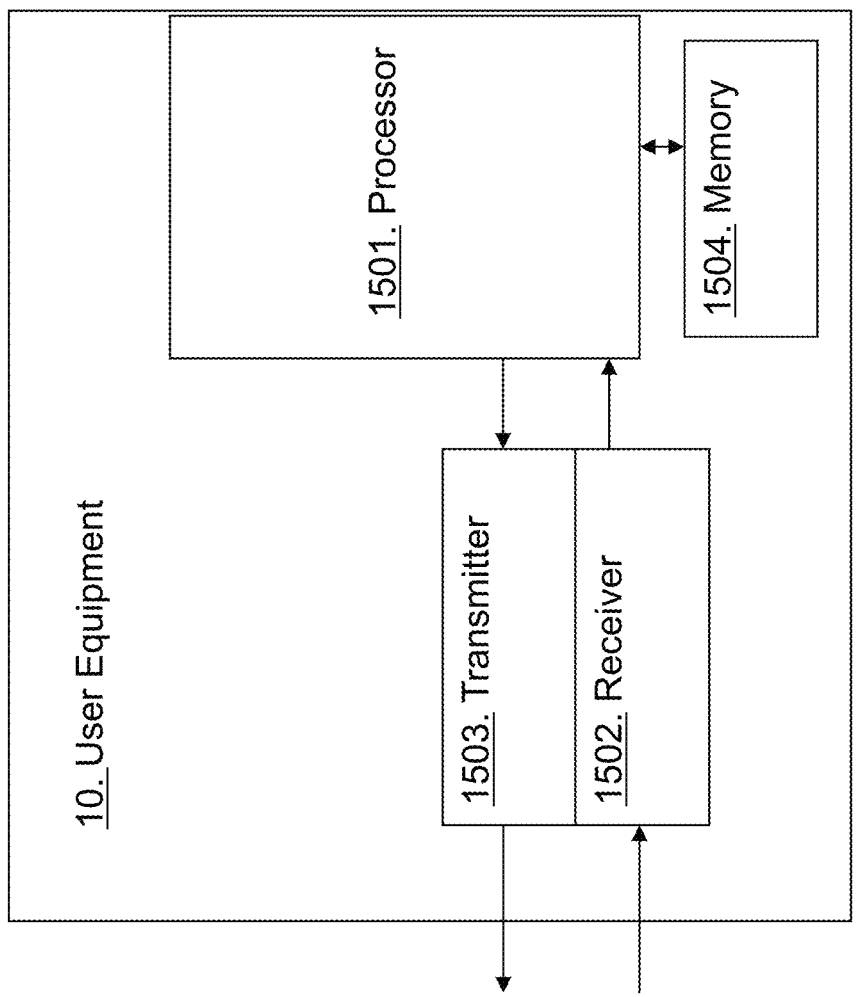
FIG. 15 shows a block diagram depicting a user equipment according to embodiments herein.
Figure 15:
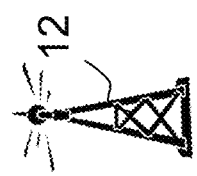

FIG. 15 shows a block diagram depicting the user equipment 10, according to embodiments herein, for performing channel estimation of one or more long term channel properties at the user equipment 10. The user equipment 10 is configured to be served by a radio network node 12.

The user equipment 10 comprises a processor 1501 configured to assume that a default CSI-RS resource is co-located with a DMRS port when co-location is not explicitly signalled from the radio network node 12. The default CSI-RS resource is configured by reading a predetermined entry in a configurable list of candidate co-location CSI-RS resources for a dynamic indication of co-location options in a DCI format. The processor 1501 is further configured to, when assumed to be co-located, estimate one or more long term channel properties of the DMRS port and the default CSI-RS resource based on the assumption that the default CSI-RS resource is co-located with the DMRS port. The processor 1501 may further be configured to estimate one or more long term channel properties of the DMRS port and the default CSI-RS resource by performing joint or partly joint channel estimation on signals from the DMRS port and the CSI-RS resource. The DCI format is e.g. the DCI format 2D. The DMRS port is an ePDCCH DMRS port or a PDSCH DMRS port. The wording "not explicitly signaled" means e.g. that a received scheduling assignment for the user equipment 10, such as a DCI message, does not include a quasi-co-location field.

The long term channel properties may comprise a group with respect of one or more long term reference signal properties comprising: received power, average channel gain, delay spread, frequency shift, Doppler spread, and propagation delay.

The user equipment 10 further comprises a receiver 1502 that may be configured to receive a co-location information from the radio network node 12. The co-location information comprises an indication of a behaviour, which behaviour is related to a co-location assumption. The indication is a composite behaviour indicating an ePDCCH behaviour and a PDSCH behaviour. A configuration of the ePDCCH behaviour and/or the PDSCH behaviour may be a function of a selected transmission mode, wherein a set of parameters configured for each behaviour is limited to parameters relevant for the selected transmission mode.

Furthermore, the user equipment 10 comprises a transmitter (TX) 1503 configured to transmit signals, feedback or similar to the radio network node. The user equipment 10 further comprises a memory 1504 that may be configured to store co-location information, default CSI-RS and similar applications that when executed performs methods herein.

Figure 16:
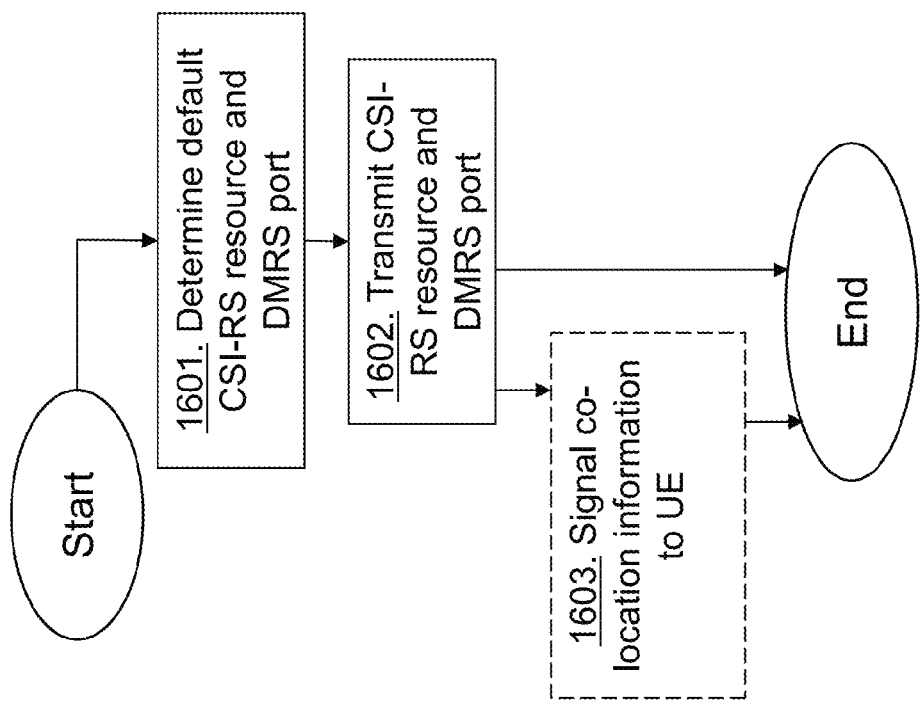
FIG. 16 shows a schematic flow chart depicting a method in a radio network node according to embodiments herein.

The method actions in the radio network node, exemplified to as the radio base station 12 in the figures, for transmitting reference signals according to some embodiments will now be described with reference to a flowchart depicted in FIG. 16. The actions do not have to be taken in the order stated below, but may be taken in any suitable order. Actions performed in some embodiments are marked with dashed boxes. The user equipment 10 is served by the radio network node.

Action 1601. The radio network node determines that the user equipment 10 assumes that the default CSI-RS resource is co-located with the DMRS port when co-location is not explicitly signalled to the user equipment 10. The default CSI-RS resource is configured by reading a predetermined entry in a configurable list of candidate co-location CSI-RS resources for a dynamic indication of co-location options in a DCI format. The format may be the DCI format 2D. The default CSI-RS resource may be a predetermined entry in a list of candidate co-location CSI-RS resources. The list may be a list for dynamic indication of co-location options. As stated above, the wording "not explicitly signaled" means e.g. that a transmitted scheduling assignment for the user equipment 10, such as a DCI message, does not include a quasi-co-location field.

Action 1602. The radio network node transmits a CSI-RS resource and a DMRS port in a co-located manner based on the determined assumption. The DMRS port may be an ePDCCH DMRS port or a PDSCH DMRS port.

Action 1603. The radio network node may signal a co-location information to the user equipment 10, which co-location information comprises an indication of a behaviour, which behaviour is related to a co-location assumption. The indication may be a composite behaviour indicating an ePDCCH behaviour and a PDSCH behaviour. A configuration of an ePDCCH behaviour and/or a PDSCH behaviour may be a function of a selected transmission mode, wherein a set of parameters configured for each behaviour is limited to parameters relevant for the selected transmission mode. Thus, the radio network node may transmit co-location information using the DCI format 2D for signaling that DMRS port for PDSCH is co-located with a specific CSI-RS resource. A message state in the DCI format 2D gives an index into a configurable table of CSI-RS resources used for defining the meaning of the message state, from the radio network node.

Figure 17:
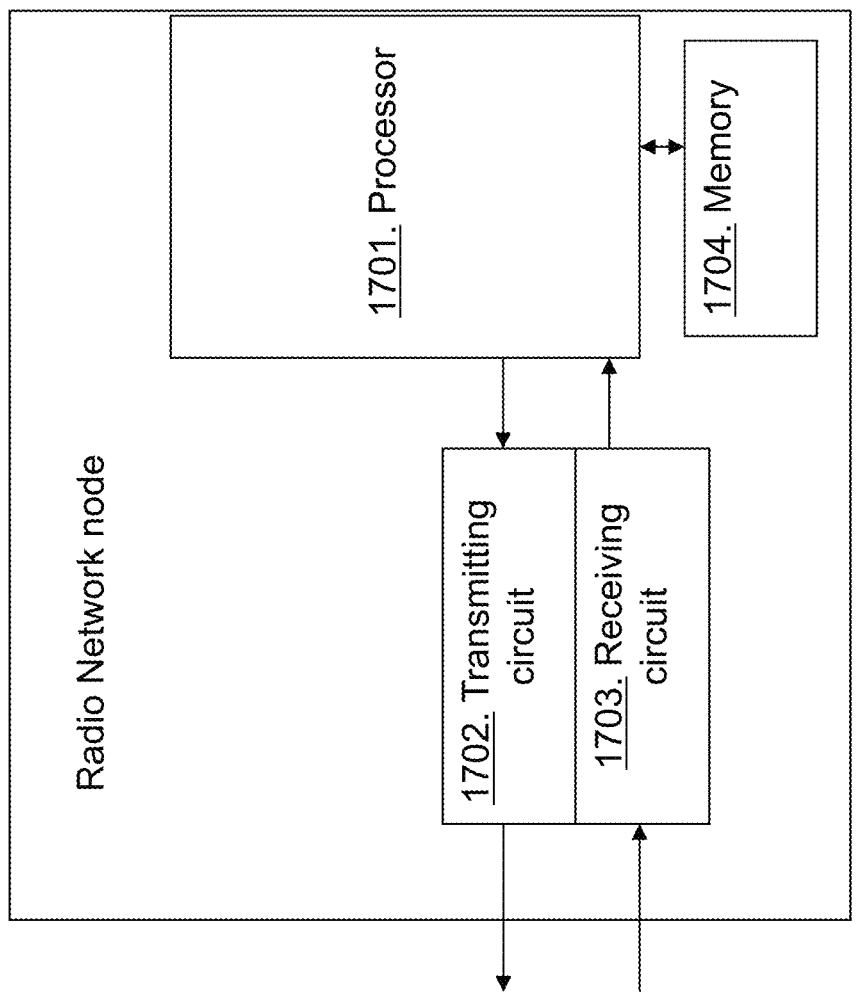
FIG. 17 shows a block diagram depicting a radio network node according to embodiments herein.
Figure 17:
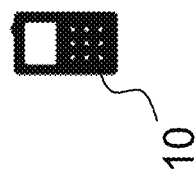

FIG. 17 is a block diagram depicting the radio network node such as the radio base station 12, according to embodiments herein, for transmitting reference signals. The radio network node is configured to serve the user equipment 10. The radio network node comprises a processor 1701 configured to determine that the user equipment 10 assumes that a default CSI-RS resource is co-located with a DMRS port when co-location is not explicitly signalled to the user equipment 10. The default CSI-RS resource is configured by reading a predetermined entry in a configurable list of candidate co-location CSI-RS resources for a dynamic indication of co-location options in a DCI format. The DCI format may be the DCI format 2D. The DMRS port may be an ePDCCH DMRS port or a PDSCH DMRS port.

The radio network node further comprises a transmitting circuit 1702 configured to transmit a CSI-RS resource and a DMRS port in a co-located manner based on the determined assumption. The transmitting circuit 1702 may further be configured to transmit a co-location information to the user equipment 10, which co-location information comprises an indication of a behaviour, which behaviour is related to a co-location assumption. The indication may be a composite behaviour indicating an ePDCCH behaviour and a PDSCH behaviour. A configuration of an ePDCCH behaviour and/or a PDSCH behaviour may be a function of a selected transmission mode, wherein a set of parameters configured for each behaviour is limited to parameters relevant for the selected transmission mode.

Furthermore, the radio network node comprises a receiving circuit 1703 configured to receive signals, feedback or similar from the user equipment 10. The radio network node further comprises a memory 1704 that may be configured to store co-location information, default CSI-RS, applications that when executed performs methods herein, and similar.

For purposes of illustration and explanation only, these and other embodiments of the present invention are described herein in the context of operating in RAN that communicates over radio communication channels with wireless terminals, also referred to as user equipment, or "UEs". More particularly, specific embodiments are described in the context of systems using LTE technology, as standardized by the membership of the 3GPP. It will be understood, however, that the present invention is not limited to such embodiments and may be embodied generally in various types of communication networks. As used herein, the terms mobile terminal, wireless terminal, or UE can refer to any device that receives data from a communication network, and may include, but are not limited to, a mobile telephone, "cellular" telephone, laptop/portable computer, pocket computer, hand-held computer, and/or desktop computer.

Also note that the use of terminology such as "base station", which may be referred to in various contexts as NodeB, for example, and "wireless terminal," "mobile terminal," or "wireless device", above often referred to as "UE" or "User Equipment" should be considering non-limiting and does not necessarily imply a certain hierarchical relation between two particular nodes of a communication link. In general, a base station, e.g., a "NodeB", and a wireless terminal, e.g., a "UE", may be considered as examples of respective different communications devices that communicate with each other over a wireless radio channel. While embodiments discussed herein may focus on wireless transmissions in a downlink from a NodeB to a UE, the inventive techniques may also be applied, for example, to uplink transmissions in some contexts. As a result, several embodiments of the invention described in detail below may be suitable for use in various wireless terminals, base stations, or both. It will be appreciated, of course, that the details of accompanying circuitry, including antennas, antenna interface circuits, radio-frequency circuits, and other control and base band circuits, will vary, depending on the specific application of the inventive techniques disclosed herein. Because these details are not necessary to a complete understanding of the present invention, those details are generally omitted in the following discussion and in the accompanying figures.

As will be readily understood by those familiar with communications receiver design, the functional blocks for performing the disclosed function, as well as one or more functions from other receiver circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several functions may be implemented on a processor shared with other functional components of a wireless terminal, for example.

Alternatively, several of the functional elements of the receiver processing circuits discussed above may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

ABBREVIATIONS

UE User Equipment
RS Reference Symbols
RB Resource Block
PRB Physical Resource Block
AP Antenna Port
AL Aggregation Level
CCE Control Channel Element
eNB evolved Node B
RBG Resource Block Group
REG Resource Element Group
eREG extended REG
eCCE enhanced CCE
ePDCCH enhanced PDCCH
PDCCH Physical Downlink Control Channel
DMRS Demodulation Reference Signals It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the present invention is limited only by the following claims and their legal equivalents.

What is claimed is:

1. A method in a user equipment for performing channel estimation of one or more long term channel properties at the user equipment, wherein the user equipment is served by a radio network node; the method comprising:

based upon co-location not being explicitly signalled from the radio network node (1) assuming that a default Channel State Information Reference Signal, CSI-RS, resource is co-located with a Demodulation Reference signal, DMRS, port, which the user equipment uses as a default setting, (2) configuring the default CSI-RS resource by reading a predetermined entry in a configurable list of candidate co-location CSI-RS resources for a dynamic indication of co-location options in a Downlink Control Information, DCI, format, (3) estimating one or more long term channel properties of the DMRS port and the default CSI-RS resource based on the assumption that the default CSI-RS resource is co-located with the DMRS port, and (4) receiving a co-location information, overriding the default setting, from the radio network node, which the co-location information comprises an indication of a behaviour, which behaviour is related to a co-location assumption, and wherein the estimating step further comprises determining a Physical Downlink Shared Channel (PDSCH) antenna port quasi co-location for decoding a PDSCH corresponding to a detected Physical Downlink Control Channel/enhanced Physical Downlink Control Channel (PDCCH/ePDCCH) with DCI format 1A and decoding a PDSCH without a corresponding PDCCH associated with Semi-Persistent Scheduling (SPS) activation indicated in the PDCCH/ePDCCH with DCI format 1A.

2. A method according to claim 1, wherein the estimating is performed by performing joint or partly joint channel estimation on signals from the DMRS port and the CSI-RS resource.

3. A method according to claim 1, wherein the DCI format is the DCI format 2D.

4. A method according to claim 1, wherein the DMRS port is an enhanced Physical Downlink Control Channel, ePDCCH, DMRS port or a Physical Downlink Shared Channel, PDSCH, DMRS port.

5. A method according to claim 1, wherein the long term channel properties comprise a group with respect of one or more long term reference signal properties comprising: received power, average channel gain, delay spread, frequency shift, Doppler spread, and propagation delay.

6. A method according to claim 1, wherein the indication is a composite behaviour indicating an enhanced Physical Downlink Control Channel, ePDCCH, behaviour and a Physical Downlink Shared Channel, PDSCH, behaviour.

7. A method according to claim 6, wherein a configuration of the ePDCCH behaviour and/or the PDSCH behaviour is a function of a selected transmission mode, wherein a set of parameters configured for each behaviour is limited to parameters relevant for the selected transmission mode.

8. A method according to claim 1, wherein 'not being explicitly signalled' means that a received scheduling assignment does not include a quasi-co-location field.

9. A method in a radio network node for transmitting reference signals, wherein a user equipment is served by the radio network node; the method comprising:

based upon not explicitly signalling co-location to the user equipment determining that the user equipment assumes that a default Channel State Information Reference Signal, CSI-RS, resource is co-located with a Demodulation Reference signal, DMRS, port, which the user equipment uses as a default setting, and wherein the radio network node has knowledge that the UE configures the default CSI-RS resource by reading a predetermined entry in a configurable list of candidate co-location CSI-RS resources for a dynamic indication of co-location options in a Downlink Control Information, DCI, format;

transmitting a CSI-RS resource and a DMRS port in a co-located manner based on the determined assumption; and, signalling, to the user equipment, a co-location information, overriding the default setting, which the co-location information comprises an indication of a behaviour, which behaviour is related to a co-location assumption, and wherein the co-location information indicates that a certain reference signal (RS) port transmitted on certain resources shares long term channel properties that are the same as those of the same or another RS port transmitted over different resources.

10. A method according to claim 9, wherein the DCI format is the DCI format 2D.

11. A method according to claim 9, wherein the DMRS port is an enhanced Physical Downlink Control Channel, ePDCCH, DMRS port or a Physical Downlink Shared Channel, PDSCH, DMRS port.

12. A method according to claim 9, wherein the indication is a composite behaviour indicating an enhanced Physical Downlink Control Channel, ePDCCH, behaviour and a Physical Downlink Shared Channel, PDSCH, behaviour.

13. A method according to claim 9, wherein a configuration of an enhanced Physical Downlink Control Channel, ePDCCH, behaviour and/or a Physical Downlink Shared Channel, PDSCH, behaviour is a function of a selected transmission mode, wherein a set of parameters configured for each behaviour is limited to parameters relevant for the selected transmission mode.

14. A method according to claim 9, wherein "not explicitly signalling" means that a transmitted scheduling assignment does not include a quasi-co-location field.

15. A user equipment for performing channel estimation of one or more long term channel properties at the user equipment, wherein the user equipment is configured to be served by a radio network node; the user equipment comprising:

a processor configured based up co-location not being explicitly signalled from the radio network node to (1) assume that a default Channel State Information Reference Signal, CSI-RS, resource is co-located with a Demodulation Reference signal, DMRS, port, which the user equipment uses as a default setting, (2) configure the default CSI-RS resource by reading a predetermined entry in a configurable list of candidate co-location CSI-RS resources for a dynamic indication of co-location options in a Downlink Control Information, DCI, format, (3) estimate one or more long term channel properties of the DMRS port and the default CSI-RS resource based on the assumption that the default CSI-RS resource is co-located with the DMRS port, a receiver configured to receive a co-location information, overriding the default setting, from the radio network node, which the co-location information comprises an indication of a behaviour, which behaviour is related to a co-location assumption;

the processor is further configured to determine a Physical Downlink Shared Channel (PDSCH) antenna port quasi co-location for decoding a PDSCH corresponding to a detected Physical Downlink Control Channel/enhanced Physical Downlink Control Channel (PD- CCH/ePDCCH) with DCI format 1A and decoding a PDSCH without a corresponding PDCCH associated with Semi-Persistent Scheduling (SPS) activation indicated in the PDCCH/ePDCCH with DCI format 1A.

16. A user equipment according to claim 15, wherein the processor is further configured to estimate one or more long term channel properties of the DMRS port and the default CSI-RS resource by performing joint or partly joint channel estimation on signals from the DMRS port and the CSI-RS resource.

17. A user equipment according to claim 15, wherein the DCI format is the DCI format 2D.

18. A user equipment according to claim 15, wherein the DMRS port is an enhanced Physical Downlink Control Channel, ePDCCH, DMRS port or a Physical Downlink Shared Channel, PDSCH, DMRS port.

19. A user equipment according to claim 15, wherein the long term channel properties comprise a group with respect of one or more long term reference signal properties comprising: received power, average channel gain, delay spread, frequency shift, Doppler spread, and propagation delay.

20. A user equipment according to claim 15, wherein the indication is a composite behaviour indicating an enhanced Physical Downlink Control Channel, ePDCCH, behaviour and a Physical Downlink Shared Channel, PDSCH, behaviour.

21. A user equipment according to claim 20, wherein a configuration of the ePDCCH behaviour and/or the PDSCH behaviour is a function of a selected transmission mode, wherein a set of parameters configured for each behaviour is limited to parameters relevant for the selected transmission mode.

22. A user equipment according to claim 15, wherein "not being explicitly signalled" means that a received scheduling assignment does not include a quasi-co-location field.

23. A radio network node for transmitting reference signals, wherein the radio network node is configured to serve a user equipment; the radio network node comprising:
   a processor configured based upon not explicitly signalling co-location to the user equipment to determine that the user equipment assumes that a default Channel State Information Reference Signal, CSI-RS, resource is co-located with a Demodulation Reference signal, DMRS, port, which the user equipment uses as a default setting, and wherein the radio network node has knowledge that the UE configures the default CSI-RS resource by reading a predetermined entry in a configurable list of candidate co-location CSI-RS resources for a dynamic indication of co-location options in a Downlink Control Information, DCI, format;
   a transmitting circuit configured to transmit a CSI-RS resource and a DMRS port in a co-located manner based on the determined assumption, and to signal, to the user equipment, a co-location information, overriding the default setting, which the co-location information comprises an indication of a behaviour, which behaviour is related to a co-location assumption, and wherein the co-location information indicates that a certain reference signal (RS) port transmitted on certain resources shares long term channel properties that are the same as those of the same or another RS port transmitted over different resources.

24. A radio network node according to claim 23, wherein the DCI format is the DCI format 2D.

25. A radio network node according to claim 23, wherein the DMRS port is an enhanced Physical Downlink Control Channel, ePDCCH, DMRS port or a Physical Downlink Shared Channel, PDSCH, DMRS port.

26. A radio network node according to claim 23, wherein the indication is a composite behaviour indicating an enhanced Physical Downlink Control Channel, ePDCCH, behaviour and a Physical Downlink Shared Channel, PDSCH, behaviour.

27. A radio network node according to claim 23, wherein a configuration of an enhanced Physical Downlink Control Channel, ePDCCH, behaviour and/or a Physical Downlink Shared Channel, PDSCH, behaviour is a function of a selected transmission mode, wherein a set of parameters configured for each behaviour is limited to parameters relevant for the selected transmission mode.

28. A radio network node according to claim 23, wherein "not explicitly signalling" means that a transmitted scheduling assignment does not include a quasi-co-location field.

29. A method according to claim 1, wherein the co-location information is received in DCI format 2D which signals that a DMRS port for a Physical Downlink Shared Channel (PDSCH) is co-located with a specific CSI-RS resource.

30. A method according to claim 9, wherein the co-location information is transmitted in DCI format 2D which signals that a DMRS port for a Physical Downlink Shared Channel (PDSCH) is co-located with a specific CSI-RS resource.

31. A user equipment according to claim 15, wherein the co-location information is received in DCI format 2D which signals that a DMRS port for a Physical Downlink Shared Channel (PDSCH) is co-located with a specific CSI-RS resource.

32. A radio network node according to claim 23, wherein the co-location information is transmitted in DCI format 2D which signals that a DMRS port for a Physical Downlink Shared Channel (PDSCH) is co-located with a specific CSI-RS resource.

33. A method according to claim 1, wherein the co-location information indicates which antenna ports are assumed to have channels which are utilized for inferring properties of a channel over which symbols for an antenna port of interest are conveyed.

34. A method according to claim 9, wherein the co-location information indicates which antenna ports are assumed to have channels which are utilized for inferring properties of a channel over which symbols for an antenna port of interest are conveyed.

35. A user equipment according to claim 15, wherein the co-location information indicates which antenna ports are assumed to have channels which are utilized for inferring properties of a channel over which symbols for an antenna port of interest are conveyed.

36. A radio network node according to claim 23, wherein the co-location information indicates which antenna ports are assumed to have channels which are utilized for inferring properties of a channel over which symbols for an antenna port of interest are conveyed.

37. A method according to claim 1, wherein the co-location information indicates that a certain reference signal (RS) port transmitted on certain resources shares long term channel properties that are the same as those of the same or another RS port transmitted over different resources.

38. A user equipment according to claim 15, wherein the co-location information indicates that a certain reference signal (RS) port transmitted on certain resources shares long term channel properties that are the same as those of the same or another RS port transmitted over different resources.

39. A method according to claim 1, wherein the co-location information indicates a group of antenna ports whose channels exhibit mutual dependence which allows the user equipment to assume that at least some long term channel properties of the channels are similar over different antenna ports.

40. A method according to claim 9, wherein the co-location information indicates a group of antenna ports whose channels exhibit mutual dependence which allows the user equipment to assume that at least some long term channel properties of the channels are similar over different antenna ports.

41. A user equipment according to claim 15, wherein the co-location information indicates a group of antenna ports whose channels exhibit mutual dependence which allows the user equipment to assume that at least some long term channel properties of the channels are similar over different antenna ports.

42. A radio network node according to claim 23, wherein the co-location information indicates a group of antenna ports whose channels exhibit mutual dependence which allows the user equipment to assume that at least some long term channel properties of the channels are similar over different antenna ports.

* * * * *